US010055275B2

(12) United States Patent
Razin et al.

(10) Patent No.: US 10,055,275 B2
(45) Date of Patent: Aug. 21, 2018

(54) APPARATUS AND METHOD OF LEVERAGING SEMI-SUPERVISED MACHINE LEARNING PRINCIPALS TO PERFORM ROOT CAUSE ANALYSIS AND DERIVATION FOR REMEDIATION OF ISSUES IN A COMPUTER ENVIRONMENT

(71) Applicant: SIOS Technology Corporation, Lexington, SC (US)

(72) Inventors: Sergey A. Razin, Columbia, SC (US); Spencer Hall Robinson, Elgin, SC (US); Tracy L. Marlatt, Lexington, SC (US); Yokuki To, Columbia, SC (US)

(73) Assignee: SIOS Technology Corporation, Lexington, SC (US)

( * ) Notice: Subject to any disclaimer, the term of this patent is extended or adjusted under 35 U.S.C. 154(b) by 116 days.

(21) Appl. No.: 15/210,840

(22) Filed: Jul. 14, 2016

(65) Prior Publication Data

US 2017/0017537 A1 Jan. 19, 2017

Related U.S. Application Data

(60) Provisional application No. 62/192,403, filed on Jul. 14, 2015.

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0754* (2013.01);
(Continued)

(58) Field of Classification Search
CPC .............. G06F 11/079; G06F 11/0709; G06F 11/3051; G06F 11/3089; G06F 11/321
See application file for complete search history.

(56) References Cited

U.S. PATENT DOCUMENTS

2011/0307743 A1* 12/2011 Khalak .............. G05B 23/0262
714/47.2
2013/0080372 A1* 3/2013 Ho .......................... G06N 5/02
706/50

(Continued)

OTHER PUBLICATIONS

International Search Report dated Oct. 20, 2016 from corresponding International application No. PCT/US2016/042365.

*Primary Examiner* — Charles Ehne
(74) *Attorney, Agent, or Firm* — Duquette Law Group, LLC

(57) ABSTRACT

Embodiments of the innovation relate to a host device having a memory and a processor, the host device configured to determine an anomaly associated with an attribute of a computer environment resource of the computer infrastructure. The host device is configured to correlate an object associated with the attribute of the detected anomaly with a related object of the computer infrastructure. The host device is configured to determine a root cause probability for each object of the correlated objects, the root cause probability identifying a probability of the correlated object functioning as a cause of the detected anomaly. The host device is configured to output an identification of a root object associated with the anomaly based upon the identified root cause probability.

22 Claims, 12 Drawing Sheets

(51) Int. Cl.
  *G06N 99/00*   (2010.01)
  *G06N 7/00*    (2006.01)
  *G06F 11/30*   (2006.01)
  *G06F 11/32*   (2006.01)

(52) U.S. Cl.
  CPC ...... *G06F 11/0772* (2013.01); *G06F 11/3051* (2013.01); *G06F 11/3089* (2013.01); *G06F 11/321* (2013.01); *G06N 7/005* (2013.01); *G06N 99/005* (2013.01)

(56) References Cited

U.S. PATENT DOCUMENTS

| | | | |
|---|---|---|---|
| 2013/0173332 A1* | 7/2013 | Ho | G06Q 10/06 705/7.27 |
| 2014/0096249 A1 | 4/2014 | Dupont et al. | |
| 2014/0122691 A1* | 5/2014 | Simhon | H04L 41/142 709/224 |
| 2014/0165054 A1* | 6/2014 | Wang | G06F 9/45558 718/1 |
| 2014/0222745 A1* | 8/2014 | Deng | G06N 7/005 706/47 |
| 2014/0324787 A1 | 10/2014 | Sengupta et al. | |
| 2015/0195126 A1 | 7/2015 | Vasseur et al. | |
| 2015/0333998 A1* | 11/2015 | Gopalakrishnan | H04L 43/16 370/244 |

\* cited by examiner

FIG. 12

APPARATUS AND METHOD OF LEVERAGING SEMI-SUPERVISED MACHINE LEARNING PRINCIPALS TO PERFORM ROOT CAUSE ANALYSIS AND DERIVATION FOR REMEDIATION OF ISSUES IN A COMPUTER ENVIRONMENT

RELATED APPLICATIONS

This patent application claims the benefit of U.S. Provisional Application No. 62/192,403, filed on Jul. 14, 2015, entitled, "Apparatus and Method of Leveraging Semi-Supervised Machine Learning Principals to Perform Root Cause Analysis and Derivation for Remediation of Issues in a Computer Environment," the contents and teachings of which are hereby incorporated by reference in their entirety.

BACKGROUND

Modern economies and business services typically run complex, dynamic, and heterogeneous Information Technology (IT) computer infrastructures. For example, computer infrastructures can include one or more servers or host devices and one or more storage arrays interconnected by communication devices, such as switches or routers. The server devices can be configured to execute one or more virtual machines (VMs) during operation. Each VM can be configured to execute or run one or more applications or workloads. Such workloads can be executed as part of on-premise (datacenter) and off-premise (public/private cloud) environments.

One of the most common issues related to running/transforming missing critical applications in cloud/virtualization environments involves performance. One such a performance issue that can affect applications in cloud/virtualization environments is related to storage, specifically datastore contention. A datastore is defined an object that is shared with VMs on the same host and/or on different hosts within an environment. Datastore contention can be caused by many different events, changes, and/or issues within the environment.

Datastore contention can be identified by an abnormal increase in input/output (IO) latency associated with the environment. The IO latency can typically affect all of the applications on a given datastore. However with storage contention, the IO latency is originated at the datastore.

Datastores are typically more isolated to a host device when the datastore is built on top of a locally attached device(s). However, there are more complex configurations, such as with SAN, where the datastore is shared between host devices and exposed to such as a single logical object (i.e., datastore or converged infrastructures), where locally attached devices are pulled together and are configured as a shared resource amongst multiple hosts (and VMs).

Another issue related to running/transforming missing critical applications in cloud/virtualization environments involves the identification of problem sources in the environments. The process of determining the source of an issue in the environment is referenced as the process of deriving/determining the root cause of the problem, which can typically involve an object that has changed its behavior, faulted, and undergone another set of events. In environments with very complex interrelationships, identification of the root cause of a performance issue, such as a datastore contention issue, is very a complicated and manual process but is required to maintain operation of the environment in the event an application issue becomes apparent to a systems administrator.

SUMMARY

Conventional approaches to address the resource contentions in cloud/virtualized environments, such as datastore, suffers from a variety of deficiencies. For example, the systems administrator is required to be familiar with certain tools (like spreadsheets) and statistics. Further, datastore contention is still very hard to do without great experience and understanding of IO metrics like (IOPs, Latency, Throughput, Outstanding IOPs, and errors). Finally there is also the issue of being able to do that continuously and repeatedly over a very large amount of statistical dataset. There is no effective way for a human to do that, especially because such process needs to be done on continual basis.

Additionally, identifying the root cause root cause of a performance issue using the conventional tools that are based on some level of threshold can be a very time consuming and complex task without an understanding of the complex inner relationships in the cloud/virtualization environments. This is particularly in the case where the issue spans different domains like application, compute, storage, and network.

In one arrangement, with reference to FIG. 1, during operation of a computer infrastructure 2, a virtual machine 3 of a host device 4 can perform a backup of other virtual machines from another host device. For example, assume virtual machine 3-14 of host device 4-2 is configured to back up virtual machine 3-4, virtual machine 3-5, and virtual machine 3-6 of host device 4-2. Further assume that virtual machine 3-14 is migrated at some point to host device 4-4. However, even after the migration, virtual machine 3-14 is still configured to perform a back-up of virtual machines 3-4, 3-5, and 3-6. These backups can create pressure (e.g., IOPS) that would result in latency on various aspects of the computer infrastructure 2. For example, because virtual machines 3-1, 3-2, and 3-3 are related to virtual machines 3-4, 3-5, and 3-6 through the network 5, a back-up of virtual machines 3-4, 3-5, and 3-6 can affect the performance, and cause latency of virtual machines 3-1, 3-2, and 3-3.

In conventional monitoring systems, the systems administrator can perform an analysis on a virtual machine, such as virtual machine 3-14 to determine the pressure created by the virtual machine 3-14 on the computer infrastructure 2. However, the conventional analysis can be time consuming (e.g., can take between 3-8 hours). Further, to determine the cause of the latency of the virtual machines 3-1, 3-2, and 3-3, the systems administrator has to collect and analyze I/O statistics from every host collected and then from the VMs that are associated with the datastore under contention. Further, the systems administrator then typically aggregates and correlates the statistics in a spreadsheet or another reporting tool, which can add additional time to the process.

By contrast to conventional methods to identify and remediate issues, such as datastore contention, embodiments of the present innovation relate to an apparatus and method of leveraging semi-supervised machine learning principals to perform root cause analysis and derivation to remediate issues in a computer environment. In one arrangement, a host device is configured to determine the behavior of each individual object, datastore, and/or virtual machine within a computer environment by leveraging the principles of machine learning and topological behavior analysis. The host device is configured to not only identify anomalies in the behavior that potentially cause the performance issues to the application, but also to correlate the anomalies to derive relationships among resources within a computer infrastructure and to determine the root cause of the problem (e.g., such as object or event). The host device is configured to present any infrastructure component events anomalies that may affect performance to the systems administrator, such as through a dashboard or user interface (UI). The UI allows the presentation of a complex issue in a comprehensive and easy to understand format.

The host device is configured to correlate the results in order to provide the systems administrator with information regarding (1) the presence of a datastore resource contention, (2) when the contention occurred, (3) the effect of the contention, and (4) the possible root cause of the contention.

Of note, while the datastore is in fact a distributed object, each individual host is connected to it independently (assuming the network attached storage Block or File). While the resource contention on the datastore can be caused by a particular "noisy neighbor", under certain circumstances the network could be an issue, particularly if the contention is isolated to a specific host (i.e. anomaly on the distributed object is not global but isolated to a particular host). Under such circumstances to the host device can also evaluate the network interface that a datastore is connected to for any anomalies related to latency and throughput.

Embodiments of the innovation relate to an apparatus configured to utilize root cause analysis and derivation to detect issues across all layers (e.g., application, storage, network, and compute) of the computer environment, such as latency issues. For example, a host device is configured to execute machine learning algorithms, such as K-means Clustering, topological (graph theory) analysis and event correlation to detect patterns and anomalies within the infrastructure. The host device is further configured to perform root cause analysis on the detected anomalies to provide a systems administrator with performance issues associated with the computer infrastructure. For example, during root cause analysis, the host device is configured to execute a causal network algorithm, such as a Naïve Bayes based algorithm to determine the root cause of a detected anomaly.

In one arrangement, the host device is configured to provide an output regarding related to the root cause analysis which allows the end user to rate or rank the detected root cause. For example, based upon the end user ranking input, the host device can perform a second root cause analysis to recalculate the root cause analysis probabilities. With such a configuration, the host device incorporates semi-supervised learning through the user input to dynamically update the probabilities.

Embodiments of the innovation relate to an apparatus configured to determine root cause analysis and derivation using the principals of semi-supervised machine learning which includes but is not limited to: anomaly detection using a clustering classification algorithm, correlation leveraging principals of the graph theory, and root cause derivation leveraging network based causality algorithm. Embodiments of the innovation relate to a method of modeling the root cause event in a form of event metadata, correlated symptoms, associated, impacted, and root cause objects. Embodiments of the innovation relate to methods of incorporating human agent input into the root cause analysis for semi-supervised learning. In one arrangement, embodiments of the innovation relate to a root cause analysis graphical user interface that provides ability to perform function of root cause analysis (i.e. examine impacted object, understand the relationship to other objects in computer environment) and examine the root cause objects, for example.

Embodiments of the innovation relate to, in a host device, a method for performing an anomaly analysis of a computer environment. The method includes determining, by the host device, an anomaly associated with an attribute of a computer environment resource of the computer infrastructure; correlating, by the host device, an object associated with the attribute of the detected anomaly with a related object of the computer infrastructure; determining, by the host device, a root cause probability for each object of the correlated objects, the root cause probability identifying a probability of the correlated object functioning as a cause of the detected anomaly; and outputting, by the host device, an identification of a root object associated with the anomaly based upon the identified root cause probability. In one arrangement, addition to identification of the root cause of a detected anomaly, the host device is configured to subsequently identify the objects impacted by the anomaly, since the anomalous object that is not the root cause is impacted.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 12 illustrates an example of a graphical user interface as output by the host device of FIG. 4, according to one arrangement.

DETAILED DESCRIPTION

Embodiments of the present innovation relate to an apparatus and method of leveraging semi-supervised machine learning principals to perform root cause analysis and derivation to remediate issues in a computer environment. In one arrangement, a host device is configured to determine the behavior of each individual object, datastore, and/or virtual machine within a computer environment by leveraging the principles of machine learning and topological behavior analysis. The host device is configured to not only identify anomalies in the behavior that potentially cause the performance issues to the application, but also to correlate the anomalies to derive relationships among resources within a computer infrastructure and to determine the root cause of the problem (e.g., such as object or event). The host device is configured to present any infrastructure component events anomalies that may affect performance to the systems administrator, such as through a dashboard or user interface (UI). The UI allows the presentation of a complex issue in a comprehensive and easy to understand format.

Figure 2:
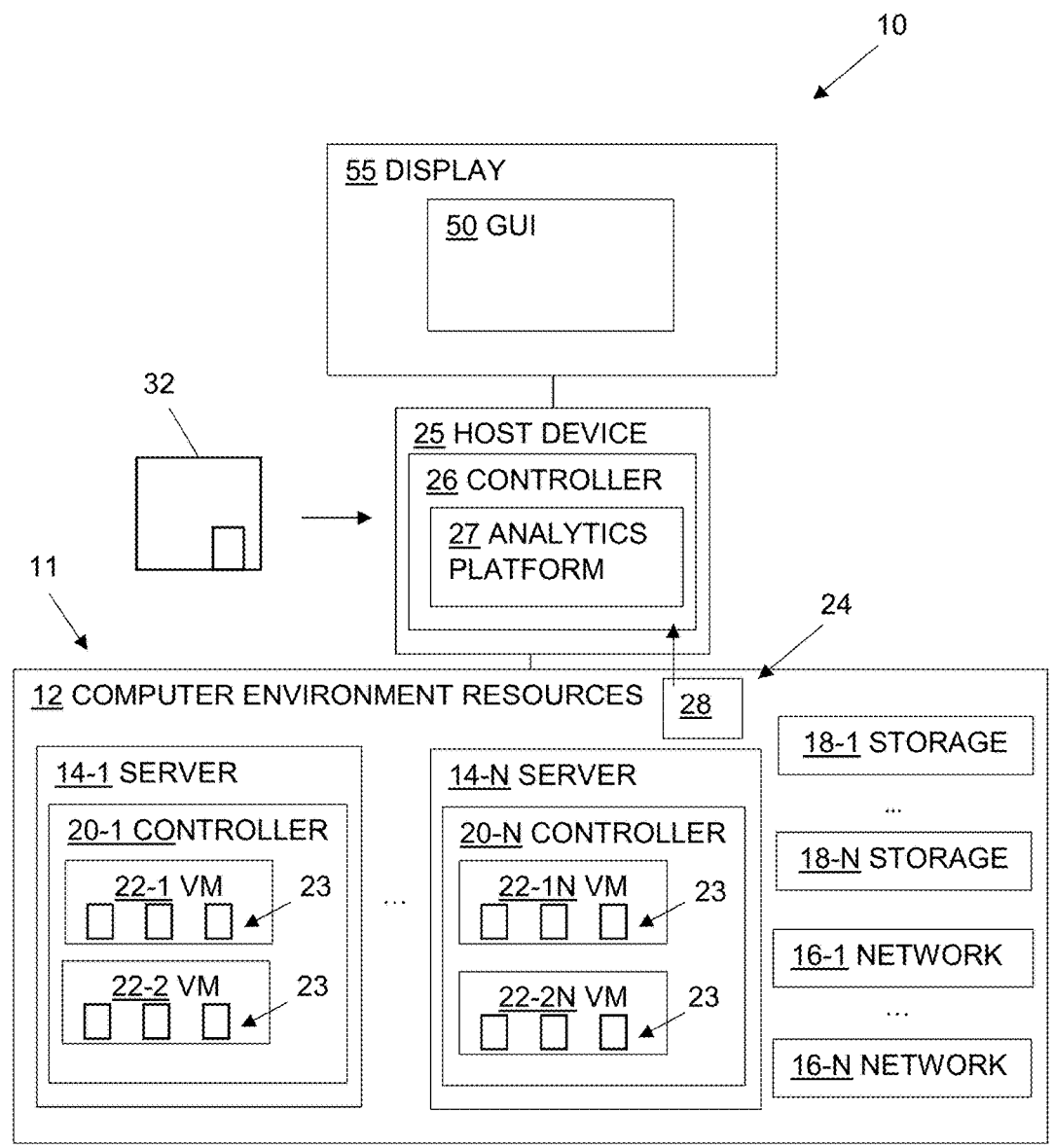
FIG. 2 illustrates a schematic depiction of a computer system, according to one arrangement.

FIG. 2 illustrates an arrangement of a computer system 10 which includes at least one computer infrastructure 11 disposed in electrical communication with a host device 25. While the computer infrastructure 11 can be configured in a variety of ways, in one arrangement, the computer infrastructure 11 includes computer environment resources 12. For example, the computer environment resources 12 can include one or more server devices 14, such as computerized devices, one or more network communication devices 16, such as switches or routers, and one or more storage devices 18, such as disk drives or flash drives.

Each server device 14 can include a controller or compute hardware 20, such as a memory and processor. For example, server device 14-1 includes controller 20-1 while server device 14-N includes controller 20-N. Each controller 20 can be configured to execute one or more virtual machines 22 with each virtual machine (VM) 22 being further configured to execute or run one or more applications or workloads 23. For example, controller 20-1 can execute a first virtual machine 22-1 and a second virtual machine 22-2, each of which, in turn, is configured to execute one or more workloads 23. Each compute hardware element 20, storage device element 18, network communication device element 16, and application 23 relates to an attribute of the computer infrastructure 11.

In one arrangement, the VMs 22 of the server devices 14 can include one or more shared objects or datastores 29. For example, server device 14-1 includes a first VM 22-1 and a second VM 22-2 which share datastore 29.

In one arrangement, the host device 25 is configured as a computerized device having a controller 26, such as a memory and a processor. The host device 25 is disposed in electrical communication with the computer infrastructure 11 and with a display 55.

The host device 25 is configured to receive, via a communications port (not shown) a set of data elements 24 from at least one computer environment resource 12 of the computer infrastructure 11 where each data element 28 of the set of data elements 24 relates to an attribute of the computer environment resources 12. For example, the data elements 28 can relate to the compute level (compute attributes), the network level (network attributes), the storage level (storage attributes), and/or the application or workload level (application attributes) of the computer environment resources 12.

During operation, the host device 25 is configured to poll the computer environment resources 12, such as via private API calls, to obtain data elements 28 relating to the compute, storage, and network attributes of the computer infrastructure 11. For example, the host device 25 can receive data elements 28 that relate to the controller configuration and utilization of the servers devices 12 (i.e., compute attribute), the VM activity in each of the server devices 14 (i.e., application attribute) and the current state and historical data associated with the computer infrastructure 11. In one arrangement, each data element 28 can include additional information relating to the computer infrastructure 11, such as events, statistics, and the configuration of the computer infrastructure 11.

While the host device 25 can receive the data elements 28 from the computer infrastructure 11 in a variety of ways, in one arrangement, the host device 25 is configured to receive the data elements 28 as part of a substantially real-time stream. As will be described below, by receiving the data elements 28 as a substantially real-time stream, the host device 25 can monitor activity of the computer infrastructure 11 on a substantially ongoing basis. This allows the host device 25 to detect anomalous activity associated with one or more computer environment resources 12 on a substantially ongoing basis over time.

Figure 4:
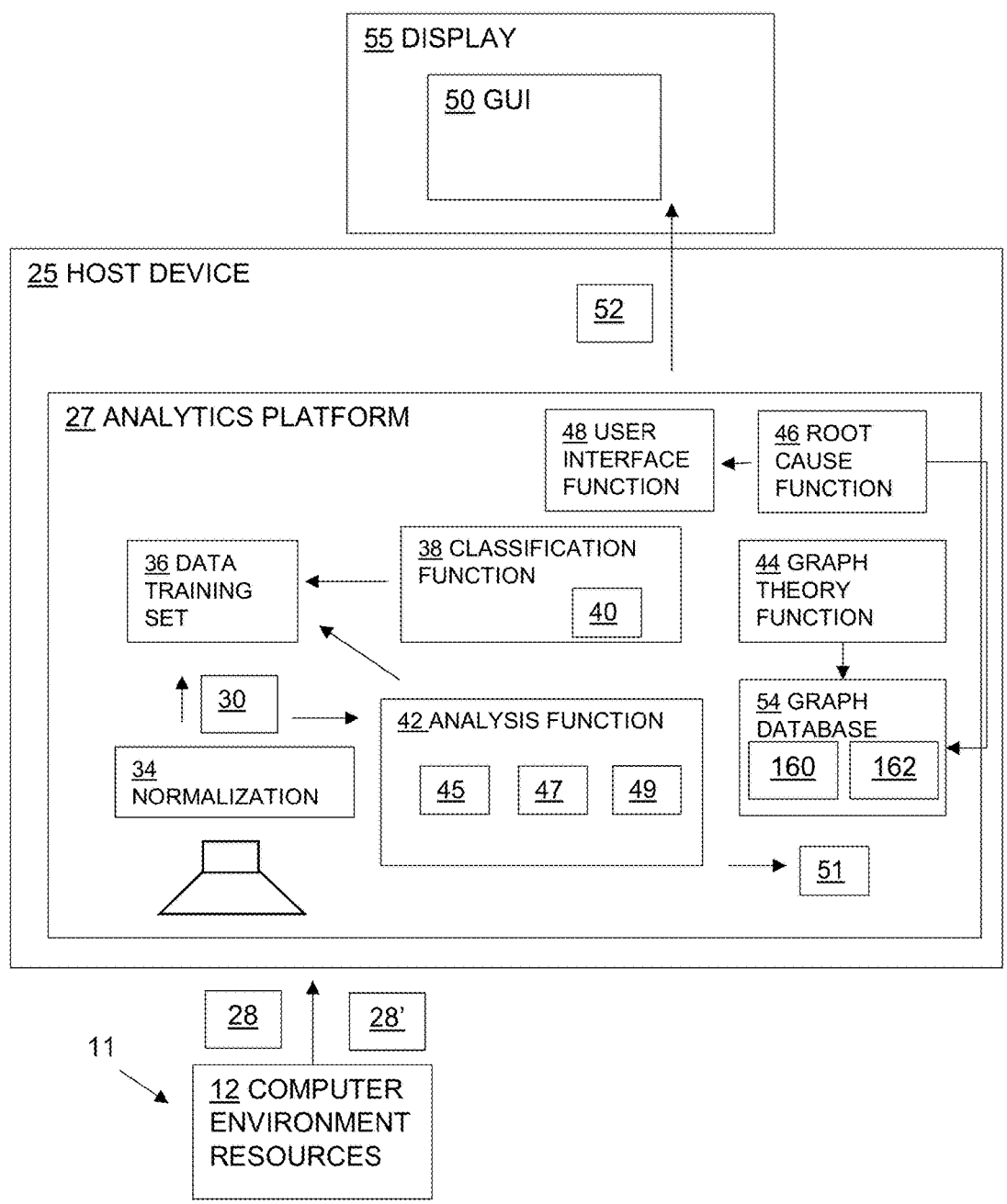
FIG. 4 illustrates a schematic depiction of the host device of FIG. 2 executing an analytics platform, according to one arrangement.

In one arrangement, the host device 25 includes an analytics platform 27 configured to perform a datastore contention analysis on the data elements 28. For example, as shown in FIG. 4, this analysis platform 27 can include a topological behavior analysis component having an anomaly detection component or analysis function 42 and a graph theory function 44. The analysis platform 27 can also include a root cause analysis function 46, as well as a user interface (UI) function 48.

Returning to FIG. 2, the controller 26 of the host device 25 can store an application for the analytics platform 27. For example, the analytics platform application installs on the controller 26 from a computer program product 32. In some arrangements, the computer program product 32 is available in a standard off-the-shelf form such as a shrink wrap package (e.g., CD-ROMs, diskettes, tapes, etc.). In other arrangements, the computer program product 32 is available in a different form, such downloadable online media. When performed on the controller 26 of the host device 25, the analytics platform application causes the host device 25 to perform the topological behavior analysis and root cause analysis.

As indicated above, problems with storage I/O are caused by datastore contention, and typically the symptom of such event is an increase in latency in the server device-datastore pairing. As the issue develops, commands begin to be aborted, normally for a single request at first, and perhaps eventually for all requests in the queue if the situation is not addressed. In one arrangement, when executing the analytics platform 27, the host device 25 is configured to identify datastore resource contentions associated with the computer infrastructure 11. For example, the host device 25 can analyze storage I/O related statistics 28 from each server device 14, as well as the VMs 22 that are connected to a given datastore.

Figure 1:
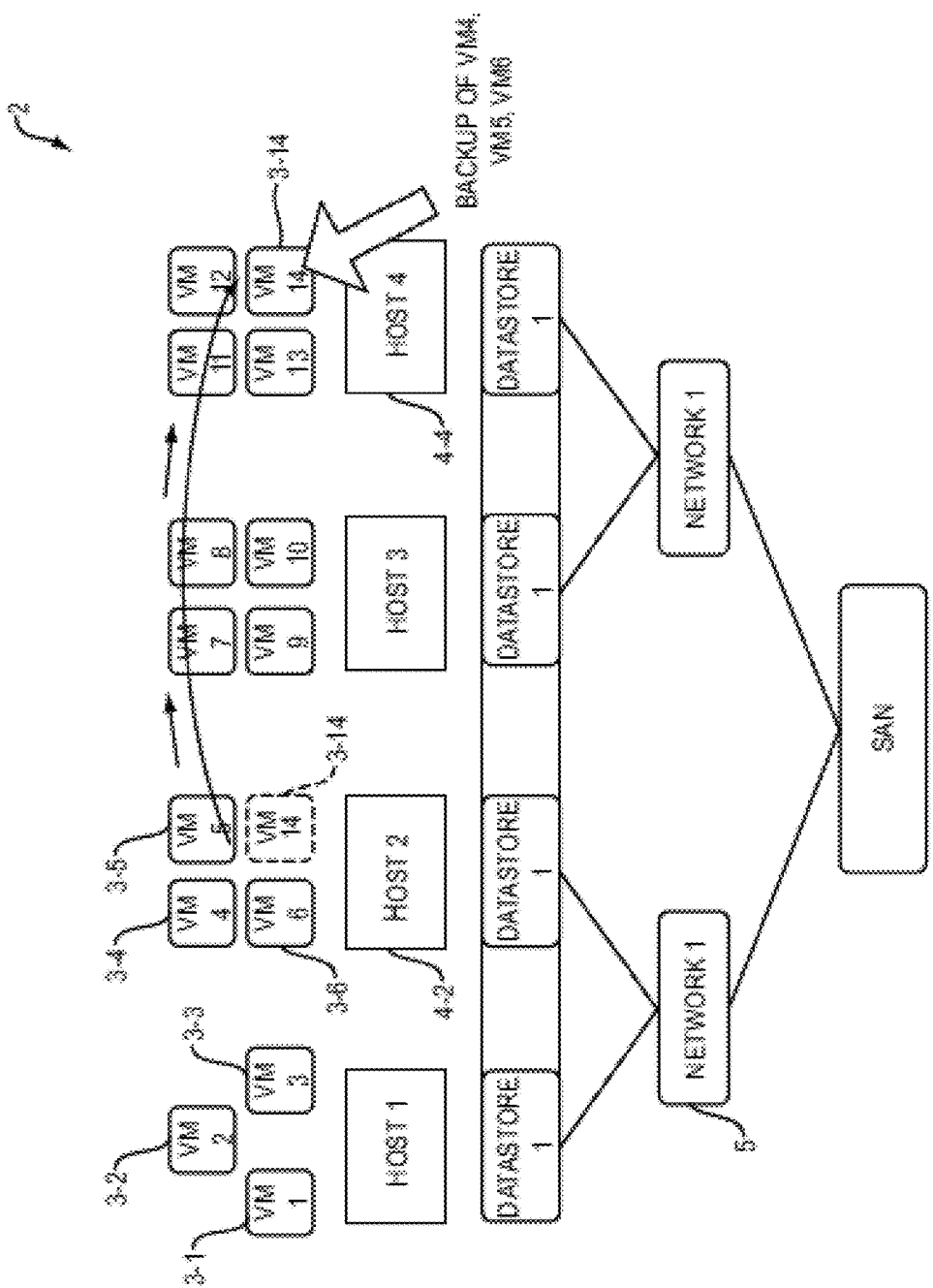
FIG. 1 illustrates a schematic representation of a prior art computer infrastructure.
Figure 3:
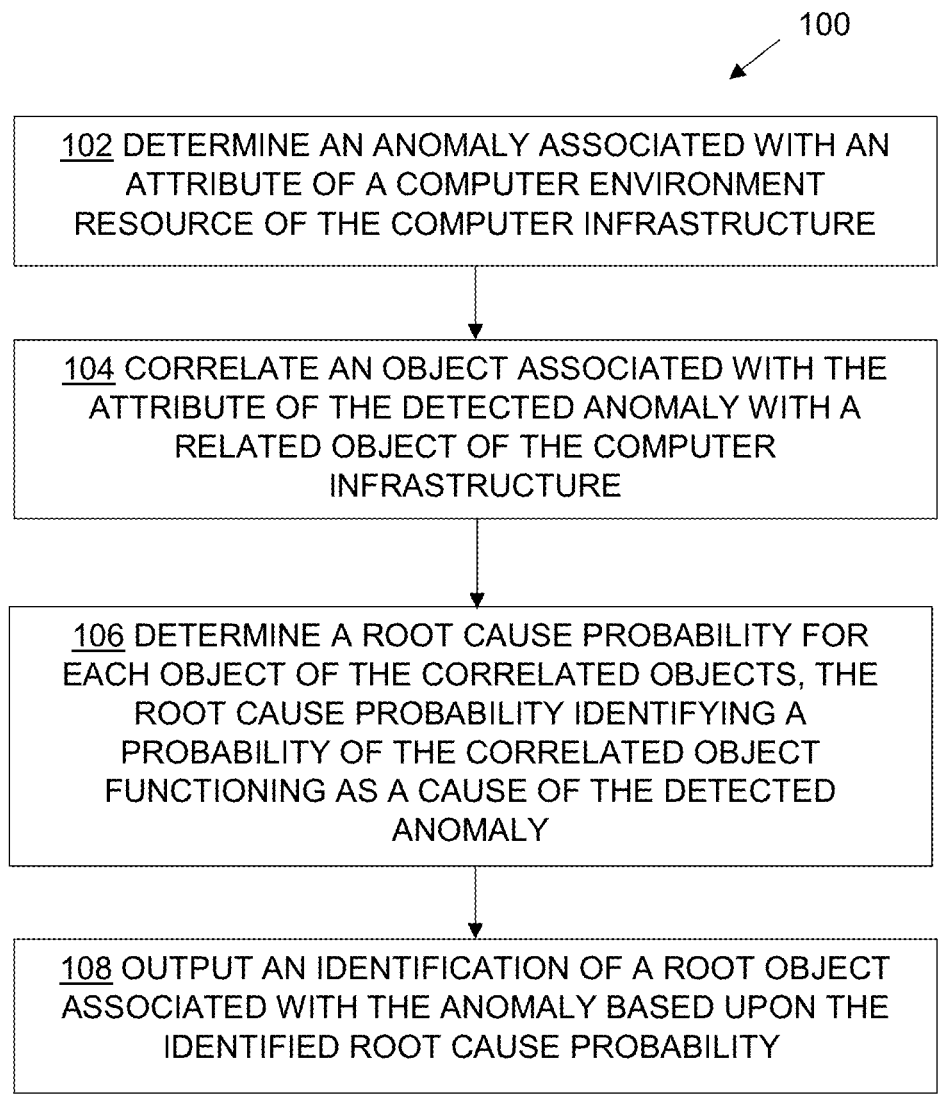
FIG. 3 is a flowchart of an example procedure performed by the host device of FIG. 2, according to one arrangement.

FIG. 3 illustrates a flowchart 100 showing an example method performed by the host device 25 of FIG. 1 when executing the analytics platform 27, such as to perform the datastore contention analysis on the data elements 28. In element 102, the host device 25 is configured to determine an anomaly associated with an attribute of a computer environment resource 12 of the computer infrastructure 11.

As provided above, the host device 25 can receive data elements 28 that relate to a variety of attributes, such as the controller configuration and utilization of the servers devices 12 (i.e., compute attribute), the VM activity in each of the server devices 14 (i.e., application attribute) and the current state and historical data associated with the computer infrastructure 11. The following provides a description of a process executed by the host device 25 when determining the presence of an anomaly associated with a datastore contention.

With respect to the detection of datastore contention, the host device 25 is configured to collect, as the data elements 28, latency information (e.g., input/output (IO) latency, input/output operations per second (IOPS) latency, etc.) regarding the computer environment resources 12 of the computer infrastructure 11. For example, the host device 25 is configured to poll the computer environment resources 12, such as via private API calls, to obtain data elements 28 relating to latency within the computer infrastructure 11. The data elements 28 can include latency statistics of a distributed datastore object and performance statistics of each individual VM that is associated with the datastore.

In one arrangement, as the host device 25 receives the latency data elements 28, the host device 25 is configured to direct the latency information 28 to a uniformity or normalization function 34 to normalize the data elements 28. For example, any number of the computer environment resources 12 can provide the data elements 28 to the host device 25 in a proprietary format. In such a case, the normalization function 34 of the host device 25 is configured to normalize the data elements 28 to a standard, non-proprietary format.

In another case, as the host device 25 receives the data elements 28 over time, the data elements 28 can be presented with a variety of time scales. For example, for data elements 28 received from multiple network devices 16 of the computer infrastructure 11, the latency of the devices 16 can be presented in seconds (s) or milliseconds (ms). In such an example, the normalization function 34 of the host device 25 is configured to format the data elements 28 to a common time scale. Normalization of the data elements 28 application of a clustering function, as described below, provides equal scale for all data elements 28 and a balanced impact on the distance metric utilized by the clustering function (e.g., Euclidean distance metric). Moreover, in practice, normalization of the data elements 28 tends to produce clusters that appear to be roughly spherical, a generally desirable trait for cluster-based analysis.

Next, the host device 25 is configured to develop a data training set 36 for use in anomalous behavior detection. The data training set 36 is configured as a baseline set of data used by the host device 25 to identify particular patterns or trends of behavior of the computer environment resources 12.

In one arrangement, the host device 25 is configured to apply a classification function 38 to the normalized latency data elements 30 (i.e., the attribute of the computer infrastructure resources of the computer infrastructure) to develop the data training set 36. While the classification function 38 can be configured in a variety of ways, in one arrangement, the classification function 38 is configured as a semi-supervised machine learning function, such as a clustering function.

Clustering is the task of grouping a set of objects in such a way that objects in the same group, called a cluster, are more similar to each other than to the objects in other groups or clusters. Clustering is a conventional technique for statistical data analysis, used in many fields, including machine learning, pattern recognition, image analysis, information retrieval, and bioinformatics. The grouping of objects into clusters can be achieved by various algorithms that differ significantly in their notion of what constitutes a cluster and how to efficiently find them. For example, known clustering algorithms include hierarchical clustering, centroid-based clustering (i.e., K-Means Clustering), distribution based clustering, and density based clustering. Based upon the clustering, the host device 25 is configured to detect anomalies or degradation in performance as associated with the various components of the computer infrastructure 11.

In one arrangement, with execution of the classification function 38, the host device 25 is configured to access the normalized latency data elements 30 to develop the data training set 36. The host device 25 can develop the data training set 36 in a substantially continuous and ongoing manner by receiving normalized latency data elements 30, where the data elements originate from the computer environment resources 12, over time. For example, with reference to FIG. 5, to develop the data training set 36, the host device 25 receives a substantially real time stream of data elements 28 from a the computer infrastructure 11, which are then normalized (e.g., normalized data elements 30), over a period of time. In one arrangement, the host device 25 is configured to apply a training function (not shown) to the normalized data elements 30 to continuously develop and train the data training set 36 based upon the ongoing stream of data elements 30. Accordingly, as the computer infrastructure attribute values change over time (e.g., shows an increase or decrease in CPU utilization for particular controllers of the computer infrastructure 11) the data training set 36 can change over time, as well.

Figure 5:
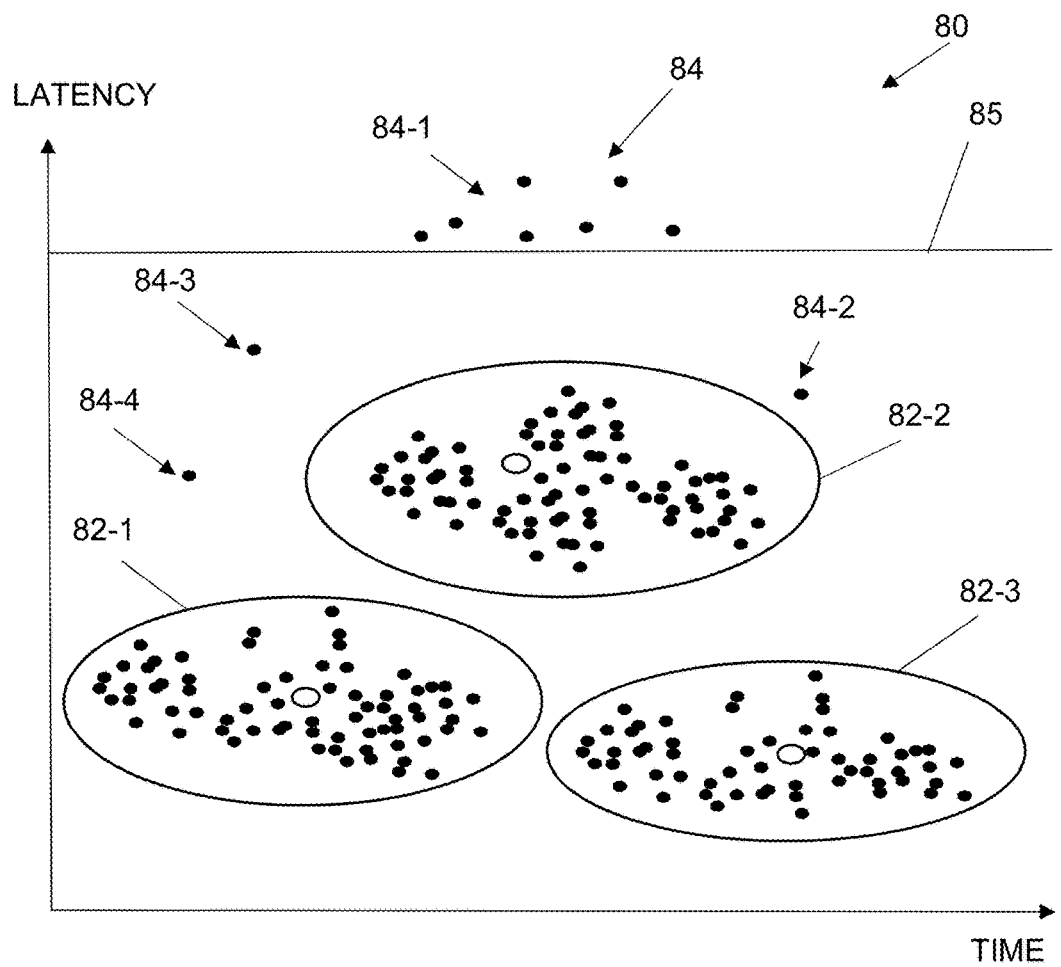
FIG. 5 illustrates a graph showing the application of a clustering function to a data training set of FIG. 4, according to one arrangement.

In one arrangement, with application of a clustering function as the classification function 38, the host device 25 stores the data training set 36 as clusters. For example, the data training set is a model encapsulated in clusters which defines values such as mean, standard deviation, maximum value, minimum value, size (e.g., the number of data points in the cluster), and a density function (e.g., how densely populated is a cluster) per object. The maximum value and minimum value can apply to the x-axis (e.g., time) and y-axis (e.g., latency), such as indicated in FIG. 5. Based upon the clustering, the host device 25 can identify certain characteristics of the latency, as well as the duration of the latency, based on the height and width of the cluster.

FIG. 5 illustrates an example of the application of the clustering function 38 to the data elements 30 to generate the data training set 36. In one arrangement, application of the classification (i.e., clustering) function 38 to the data elements 28 can result in the generation of sets of clusters 82. For example, following application of the characterization function 80, the training data set 47 can include first, second and third clusters 82-1, 82-2, and 82-3, where each cluster 82-1 through 82-3 identifies computer infrastructure attributes having some common similarity (e.g., input/output (IO) latency, input/output operations per second (IOPS) latency, etc.).

In one arrangement, with reference to FIG. 4, after developing the data training set 36, (e.g., normalized latency data elements 30 collected over a period of time, such as seven days) the host device 25 is configured to apply an analysis function 42 to the data training set 36 and to normalized latency data elements 30 to identify anomalies.

For example, the host device 25 is configured to utilize the analysis function 42 as applied to particular sets of use cases of the data training set 36, such as datastore contention and storage performance latencies, to detect anomalies related to latency as associated with various computer environment resources 12 of the computer infrastructure 11. With reference to FIG. 4, the host device 25 can apply an analysis function 42 to the data training set 36 and to the normalized latency data elements 30 to determine anomalies of the latency information associated with the computer infrastructure 11.

As provided above, and with continued reference to FIG. 4, the host device 25, when executing the analysis function 42, is configured to compare the normalized latency data elements 30 with the data training set 36. With such application of the analysis function 42, the host device 25 can determine trends associated with the normalized latency data elements 30, as well as the presence of anomalous behavior associated with the computer environment resources 11.

For example, with execution of the analysis function 44, by comparing normalized latency data elements 30 with the data training set 36, the host device 25 is configured to identify outlying data elements 84 (e.g., data elements that fall outside of the clusters 82) as data anomalies which represent anomalous activity associated with the computer infrastructure 11. For example, with reference to FIG. 5, comparison of normalized latency data elements 30 with the data training set 36 yields a number of objects 84 which fall outside of the clusters 82. As a result of the analysis (e.g., application of the analysis function 42), the host device 25 can identify the data elements 84-1, 84-2, 84-3, and 84-4 falling outside of the clusters 82-1 through 82-3 of data elements and, as such, being indicative of anomalous data elements and anomalous behavior (e.g., latency) associated with the computer infrastructure 11.

In one arrangement, the analysis function 42 can be configured in a variety of ways to filter the anomalous data results determined by the host device 25.

For example, with reference to FIG. 5, the analysis function 42 can also be configured as a best practices function 45 and can apply a best practices threshold 85 to the data elements 84-1, 84-2, 84-3, and 84-4 falling outside of the clusters 82-1 through 82-3. The best practices threshold 85 is configured as a cutoff to distinguish non-anomalous, non-clustered latency information elements (e.g., "bad" elements) 84-1 from anomalous, non-clustered latency information elements. Based upon application of the best practices threshold 85, the best practices function 45 minimizes or eliminates data elements 84-1 as being considered as anomalous data elements and provides data elements 84-2, 84-3, and 84-4 as the anomalous data elements.

Figure 6:
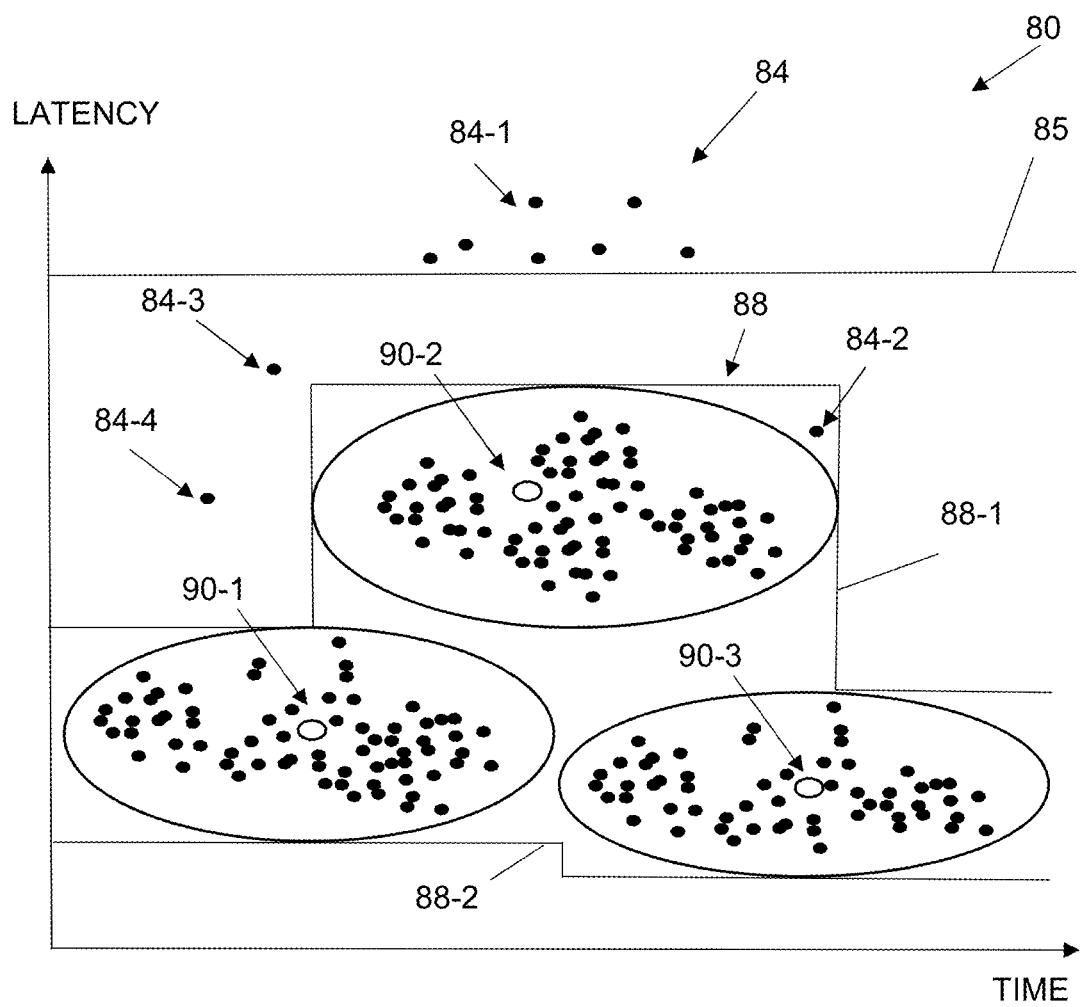
FIG. 6 illustrates a graph showing the application of a learned behavior function to the data training set of FIG. 4, according to one arrangement.

In another example, with reference to FIG. 6, the analysis function 42 can also be configured as a learned behavior function 47 to define a learned behavior boundary 88 relative to the data element groupings of clusters 82. The learned behavior boundary 88 is configured to provide a scalable cutoff to the clusters 82 to distinguish non-anomalous, non-clustered latency information elements from anomalous, non-clustered latency information elements. For example, the learned behavior function 47 defines the learned behavior boundary 88 as being three standard deviations from the centroid 90 of each cluster 82.

In the example illustrated, the learned behavior function 47 applies first and second learned behavior boundaries 88-1, 88-2. Based upon application of the learned behavior boundaries 88-1, 88-2, the learned behavior function 47 minimizes or eliminates data element 84-2 as being considered as anomalous data element as the data element 84-2 falls within the learned behavior boundaries 88-1, 88-2. Further, the learned behavior function 47 provides data elements 84-3 and 84-4 as the anomalous data elements as the data elements 84-3 and 84-4 fall outside of the learned behavior boundaries 88-1, 88-2.

Figure 7:
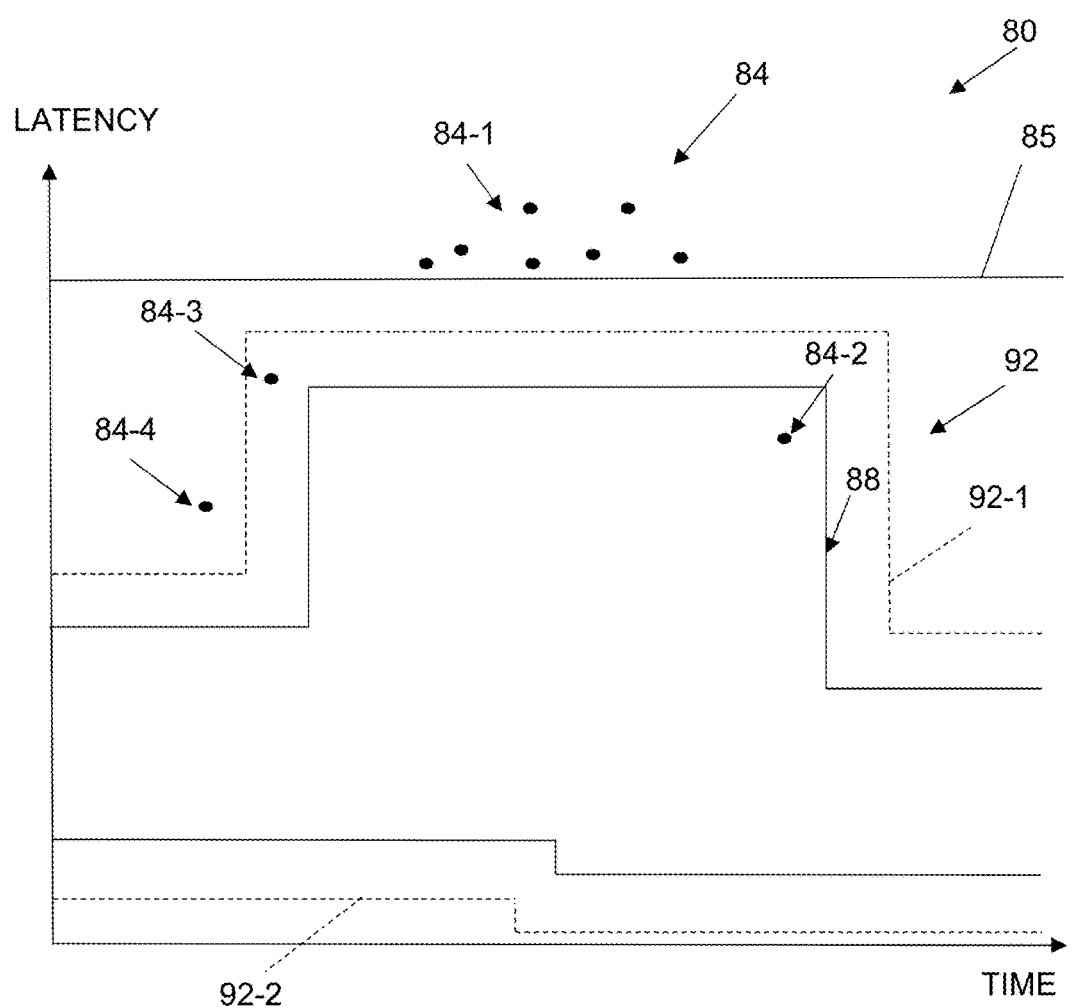
FIG. 7 illustrates a graph showing the application of a sensitivity function to the data training set of FIG. 4, according to one arrangement.

In another example, with reference to FIG. 7, the analysis function 42 can also be configured as a sensitivity function 49 to define a sensitivity boundary 92 relative to the previously-defined learned behavior boundaries 88. The sensitivity boundary 92 is configured to limit or prevent the reporting of insignificant anomalies and to provide the systems administrator with the ability to influence the semantics of the decision. For example, the sensitivity function 49 can change the behavior of the anomaly detection framework by allowing the systems administrator to adjust the learned behavior thresholds so that insignificant anomalies not shown as anomalous results.

With reference to FIG. 7, the sensitivity boundary 92 is configured to provide a threshold to the learned behavior boundaries 88 to distinguish non-anomalous, non-clustered latency information elements from anomalous, non-clustered latency information elements. In the example illustrated, the sensitivity function 49 applies first and second sensitivity boundaries 92-1, 92-2 to the learned behavior boundaries 88. Based upon application of the sensitivity boundaries 92-1, 92-2, the sensitivity function 49 minimizes or eliminates data element 84-3 as being considered an anomalous data element as the data element 84-3 falls within the learned behavior boundaries 88-1, 88-2. Further, the sensitivity function 49 provides data elements 84-4 as the anomalous data element as the data element 84-4 falls outside of the sensitivity boundaries 92-1, 92-2.

Operation of the computer infrastructure 11 can create new data elements 28 to identify changes in the compute level, the network level, the storage level, and/or the application or workload level over time. In one arrangement, the host device 25 is configured to update the data training set 36 in a substantially ongoing basis to allow for detection of changes in anomalous activity within the computer infrastructure 11. For example, with reference to FIG. 4, the host device 25 is configured to receive updated data elements 28 from the computer infrastructure 11 over time, such as part of a stream, and to provide the updated data elements 28 to the data training set 36. The host device 25 is further configured to apply the classification function 38 to the data training set 36, which includes the updated data elements 28 in order to identify anomalous data elements associated with the computer infrastructure 11. With substantially continuous updating and characterization of the data training set 36, the host device 25 can detect changes to the behavior of the computer environment resources over time.

In response to detecting an anomalous data element 84, in one arrangement, the host device 25 is configured to provide an incident notification 51 to the systems administrator regarding the presence of the anomaly associated with the computer infrastructure 11. In one arrangement, an incident notification 51 is an event that suggests to a user that the abnormal behavior of an object has been detected and possibly requires attention. That is, until correlation is introduced (i.e., contention which described later), there is not clear indication whether the anomaly in anyway affects any of the elements of the infrastructure.

While the incident notification 51 can be configured in a variety of ways, in one example, the incident notification can have the following set of criteria defined:
Category—Capacity/Performance/Reliability/Efficiency
(P—for Datastore contention)
Time—start and end date/time Duration—can be derived from the start and end times
Layer—Application/Compute/Storage/Network (Storage—for Datastore contention)
Issue Type—Storage Contention/Compute Contention/Network Contention
Severity—Critical/Warning/Info Associated Objects—effected object to be added with resource contention Symptoms—latency increase (actual value, trend, difference, etc.)

Accordingly, reporting of the incident notification 51 to a systems administrator can provide the administrator with information regarding potential issues with the computer infrastructure 11.

Figure 8:
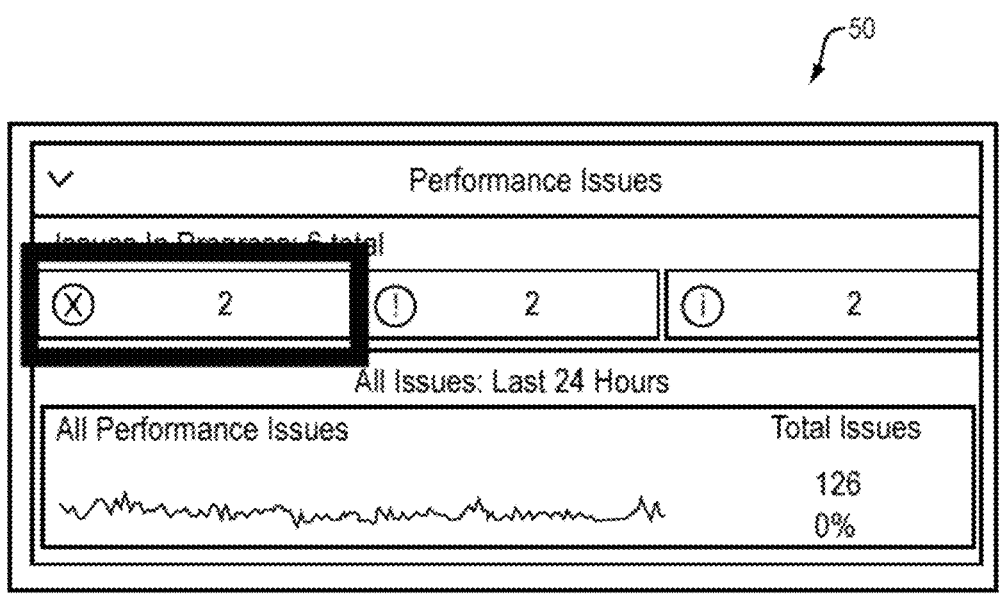
FIG. 8 illustrates and example of an incident notification, provided as part of a graphical user interface, according to one arrangement.

In one arrangement, the host device 25 is configured to provide the incident notification 51 as part of a GUI 50, as provided by the display device 55. For example, as illustrated in FIG. 8, the host device 25 can provide the incident notification 51 as an average latency graph 90 to indicate the workload in the computer infrastructure 11 and to indicate the presence of an anomaly associated with latency in the computer infrastructure 11.

In one arrangement, the host device 25 can be configured to limit the frequency of incident notifications 51 provided to the systems administrator. For example, a system administrator may not want to receive a set of anomalies that are occurring at intervals of one every five seconds apart as individual anomaly incident notifications 51.

By contrast, there could be an event that continues indefinitely (i.e., a new load is added which causes the behavioral anomaly however that event does and will unlikely go away). To limit the frequency of incident notifications 51, the host device 25 is configured to determine at what time the host device 25 provides the incident notification 51, such as provided in the following example.

Incident is being fired right away without the end date/time (independent of the duration). The downside that if we decide to do any type of correlation in the graph it will not be possible to fill in the area of anomaly until the end is available.

Incident is being fired only when the end date/time is available. Which mean that it is possible that administrator or application owner maybe already experiencing the issue and may have to know about it earlier (which takes us back to the earlier mentioned strategy). However it may make sense to keep in mind that it is not a monitoring tool.

In one arrangement, the host device 25 is configured with an event (anomaly and root cause) relationship delta threshold. This threshold defines the delta time between the events that occur and related to a particular object that would relate the events and ultimately establish the end time for the ongoing event.

Below is an example definition of thresholds:

A. IF anomaly event (or set of events) occurs within the poll cycle timeframe (current poll cycle is 5 min) and the delta between the events within the poll cycle collected data (i.e. 5 min unless it is a fresh start) <=relationship threshold then the event (anomaly/root cause) does not end (i.e. end time is blank) and therefore continue.

B. IF the delta time between the events>relationship threshold then the end time is set to the last occurrence of the event Once the host device 25 has detected the presence of an anomaly (e.g., latency issue) associated with the computer infrastructure 11, the host device 25 is configured to perform a root cause analysis on the object associated with the anomalous data element to identify the probable source of the anomaly. For example, with reference to FIG. 4, the host device 25 is configured to apply a root cause function 46 to the object associated with the detected anomaly as part of the root cause analysis.

Generally, when performing a root cause analysis for anomalies, a computerized device determines information about a set of related objects, regardless of their type associated with the anomaly. For example, to determine the root cause of an anomaly for a datastore, the host device 25 is configured to find all related objects (hosts, VMs, virtual disks, other datastores) related to that datastore. Typically, all of the data utilized as part of a root cause analysis is conventionally stored in a relational database and, as such, the computerized device will typically access a conventional database, such as a relational (sometimes referred to as SQL) database, to retrieve this information. However, the use of a relational database as part of a root cause analysis requires the computerized device to perform many complex procedures to query this information. Accordingly, the results of the root cause analysis would be difficult to consume, as the results would include a different result set for each type of object returned.

One type of non-relational database is the graph database. The graph database can provide the host device 25 with the ability to capture and search through very complex relationships in a dataset. Each of the relational and graph databases is better suited to particular types of data and particular types of operations than the other. For example, relational databases are typically suited to highly uniform data in which each type of data being stored have all the same properties. Relational databases also typically perform relatively fast when calculating mathematical properties, such as averages with many data points. Graph databases, by contrast, are typically suited to irregular data where different objects of the same type may have different sets of properties (e.g., a database might store information about persons, and some persons will have a "salary" property and some won't). Graph databases are configured to perform operations related to relationships faster and simply than relational databases. For example, a social graph has many different types of relationships between people (spouse, sibling, co-worker, friend, etc.). A graph database are also configured to query information about those relationships in a relatively fast manner, while relational databases can take time with this type of query.

In one arrangement, the host device 25 is configured to develop a graph database 54 of the objects representing the computer infrastructure 11, for use during the root cause analysis, using graph theory. Graph theory relates to the study of graphs which are mathematical structures used to model pairwise relations between objects. A graph in this context is made up of vertices or nodes and lines or edges that connect the nodes. Accordingly, the graph is an ordered pair G=(V, E) that includes a set of V vertices or nodes together with a set of lines or edges which represent the relationship between the nodes are 2-element subsets of V (i.e., an edge is related with two vertices). The relation is represented as an unordered pair of the vertices 32 with respect to the particular edge.

Returning to FIG. 4, during operation and in one arrangement, the host device 25 is configured to apply a graph theory function 44 to the data elements 28 associate with the computer infrastructure to define the topology of the computer infrastructure 11. For example, the host device 25 can apply the graph theory function 44 to each object of the computer infrastructure 11 to define each object as a node in the graph database 54. Additionally, the host device 25 is configured to apply the graph theory function 44 to each object 28 to define a set of edges among the nodes based upon the relationships among the objects (e.g., based upon relationship criterion associated with the object).

In one arrangement, to generate the graph database 54, the host device 25 is configured to apply the graph theory function 44 to a relational database to identify all related objects, such as management objects, and migrate the management objects from the relational database to the graph database 54. The following describes to the saving of management objects (VMs, Hosts, etc.) to a graph database.

In one arrangement, the host device 25 can be configured to execute a graph search query to find any objects with a path to the given object that does not go through an environment. In one arrangement, excluding environments in the path is provided because many objects are members of the same environment (i.e., a datastore and a host can be members of the same environment but share no other relationship; in this situation an anomaly in the datastore is unlikely to be related to the status of the host). For example, the host device 25 is configured to take an event, such as a data element exhibiting an anomaly, and an identification of the object associated with the anomaly to find related objects.

As provided above, following detection of an anomaly associated with the computer infrastructure 11, such as an anomaly associated with latency, the host device 25 is configured to apply a root cause analysis function 46 to the detected anomaly to identify the probable source of the anomaly.

In one arrangement, prior to applying the root cause function 46, the host device 25 is configured to access the graph database 54 to identify objects that are affected by the detected anomalous object. For example, returning to the flowchart 100 of FIG. 3, in element 104, the host device 25 is configured to correlate an object associated with the attribute of the detected anomaly with a related object of the computer infrastructure 11. Based upon such correlation, the host device 25 determines the topology of the computer infrastructure 11 which includes the object associated with the detected anomaly, as well as the relationship of the anomalous object to other objects associates with the computer infrastructure.

Figure 9:
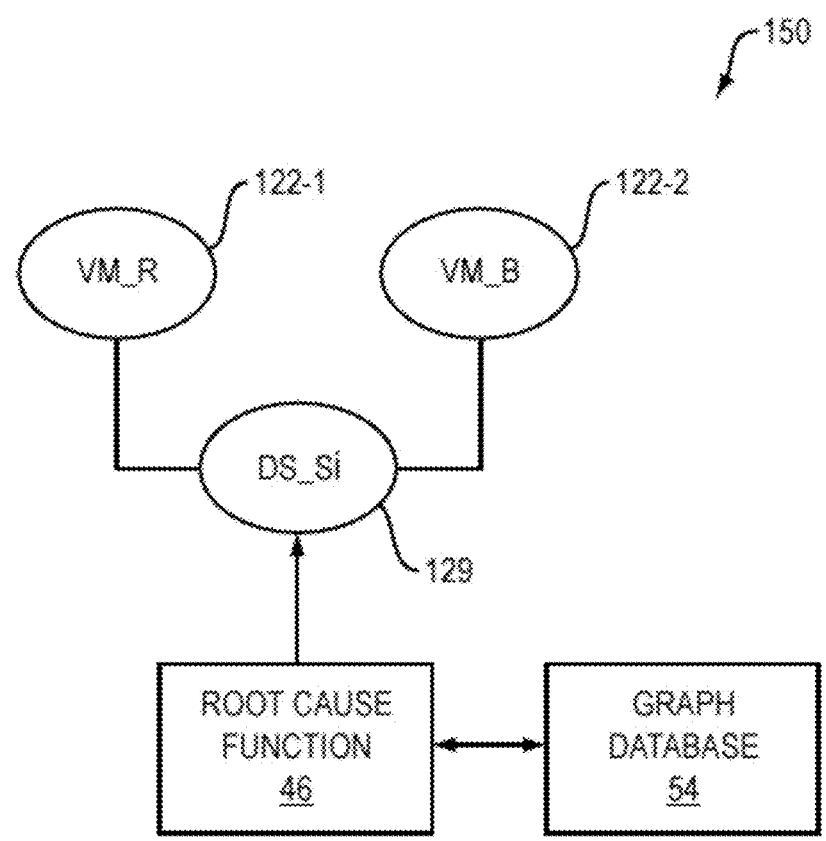
FIG. 9 is a schematic diagram illustrating the correlation of objects from a graph database as provided by the host device of FIG. 4, according to one arrangement.

For example, with reference to FIG. 9, assume the case where host device 25 identifies an anomaly, such as a latency, associated with a first virtual machine 22-1 (i.e., VM_R). Based upon such an identification, the host device 25 executes the root cause function 46 to access the graph database 54 in order to identify a first VM object 122-1 associated with the first virtual machine 22-1. Using the topological relationships provided in the graph database 54, the host device 25, executing the root cause function 46, can traverse the relationships to identify all of the related objects associated with (e.g., connected to or touching) the first VM object 122-1. For example, the root cause function 46 can identify a datastore object 129 (i.e., DS_Si) and a second VM object 122-2 (e.g., VM_B) as being associated with the first VM object 122-1, as provide by topology 150. Accordingly, by accessing the graph database 54, the host device 25 can identify all objects associated with a detected anomaly for further root cause analysis.

After determining the topology 150 of the anomalous and related objects, the host device 25 considers each of these management objects as a possible root cause or source of the anomaly. The host device 25 is configure to analyze VM specific I/O performance data of the objects to determine whether each object is actually experiencing the anomaly and is the source of the anomaly. For example, returning to the flowchart 100 of FIG. 3, in element 106, the host device 25 is configured to determine a root cause probability for each object of the correlated objects, the root cause probability identifying a probability of the correlated object functioning as a cause of the detected anomaly.

While the root cause function 46 can configure the host device 25 to perform the root cause analysis in a variety of ways, in one arrangement, the root cause function 46 is configured to determine a prior probability of an anomaly caused by one of anomalous object and related objects, a conditional probability of anomaly caused by one of anomalous object and related objects, and a posterior probability of anomaly caused by one of anomalous object and related objects. In one arrangement, the root cause function 46 configures the host device 25 to apply a set of templates to the topology 150 to determine the root cause of the anomaly. The following provides a description of the example templates applied by the root cause function 46 to determine the prior probability, conditional probability, and the posterior probability.

For example, with reference to FIG. 4, in the case where the host device 25 detects an anomaly associated with latency, the host device 25 is configured to identify a set of observations associated with the objects of the topology 150. An observation in one arrangement (i.e., termed a feature in Naive Bayes Classifier terminology) is any behavior that the host device 25 determines to have occurred or not occurred in the system 10. The observation can relatively granular, such as a certain range for a certain measurement (e.g., is a certain VM's IOPs measurement greater than a certain amount), or relatively general, such as whether the entire environment has more than one anomaly in progress. For example, an observation can identify whether a certain datastore has experienced a spike in latency or whether a certain VM experienced a vMotion in the last five minutes before an anomaly began.

In one arrangement, observations are saved as ObservationTemplate nodes (observation nodes) 160 in the graph database 54. The observation nodes 160 include properties 161 that can provide details for the root cause function 46 to determine if an observation has occurred. For example, with reference to FIG. 10, the observation node 160 is configured as an Anomaly Observation node 160-1, 160-2. This node 160 includes, as properties 161, the type of object that might have the anomaly (e.g., VM, datastore, etc.), as well as a type of anomaly that may have occurred (e.g., IOPs anomaly).

Returning to FIG. 4, in the case where the host device 25 detects an anomaly associated with latency, the host device 25 is also configured to identify a set of possible root causes associated with the objects of the topology 150. In one arrangement, a root cause is a management object (e.g., VM, datastore, host, etc.) that is the true cause of an observed anomaly. In one arrangement, possible root causes are saved as RootCauseTemplate nodes 162 in the graph database 54. For example, with reference to FIG. 10, the graph database 54 can store a root cause node 162-1, 162-2 for each type of management object (VM, datastore, etc.) which is a possible root cause of the anomaly.

Figure 10:
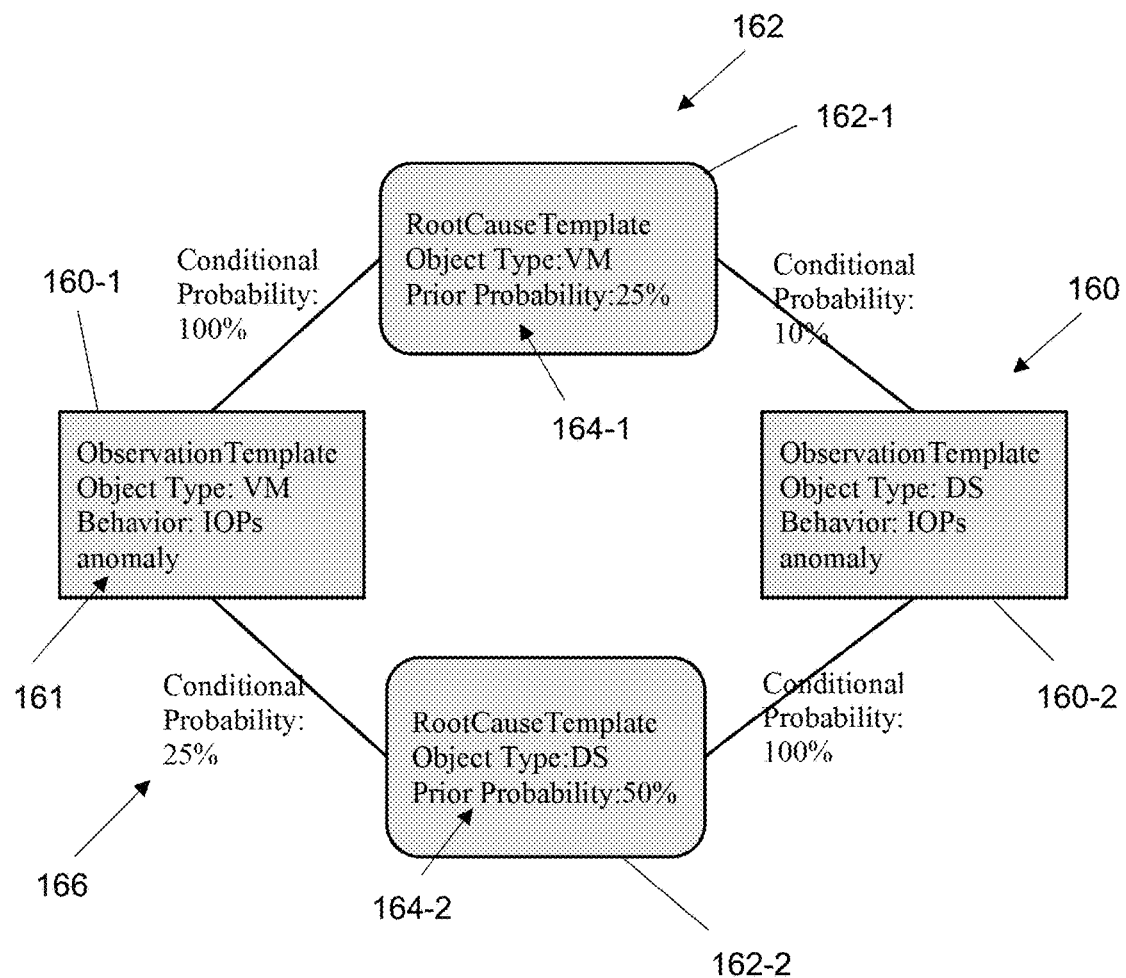
FIG. 10 is a schematic diagram illustrating a configuration of observation nodes and root cause nodes, according to one arrangement.

As indicated in FIG. 10, Each RootCauseTemplate node 162 includes a prior probability value 164 as a property of the node (e.g., as stored by the graph database 54). In one arrangement, a prior probability is the probability that a certain object is the true Root Cause in the absence of any other evidence. That is, the prior probability value 164 indicates the likelihood that a particular object caused that anomaly when the evidence only indicates that an anomaly occurred on an object. For instance, the VM possible root cause node 162-1 includes a prior probability value 164-1 of 25% which represents the prior probability of the Root- CauseTemplate node 162-1 being the root cause of the detected anomaly while the datastore possible root cause node 162-2 includes a prior probability value 164-2 of 50% which represents the prior probability of the RootCauseTemplate node 162-2 being the root cause of the detected anomaly.

Based upon the observation nodes 160 and the RootCauseTemplate nodes 162, the root cause function 46 is configured to model the edges between the observation nodes 160 and the RootCauseTemplate nodes 162 as ConditionalProbabilities (i.e., conditional probabilities) 166. In one arrangement, a conditional probability indicates how likely an observation is to be observed given that a certain object is the true root cause. For instance, there might be a 10% probability that a given VM has experienced a latency anomaly if that VM is the true root cause of the anomaly and there might be a 100% chance that a given VM has experienced a latency anomaly if some other object is the true root cause of the anomaly.

Based upon the prior probability 164 and the conditional probability 166, the host device 25 is configured to determine the posterior probability associated with the management objects. In one arrangement, the posterior probability is the probability that a given management object is the true root cause of an anomaly, once the host device 25 had considered all of the observed evidence. For example, in a Naive Bayes Classifier, the posterior probability is calculated as the product of the prior probability and all applicable conditional probabilities.

During operation, and in one example, when performing a root cause analysis, the host device 25 is configured to perform the following via the root cause function 46, utilizing the templates described above, to determine the root cause of a detected anomaly.

For example, assume the host device 25 detects the presence of an anomalous object and utilizes the graph database 54 to find the anomalous object's associated objects. The host device 25 considers each of these management objects is a possible root cause of the anomaly. For each of these possible Root Causes, the host device 25 is configured to retrieves a RootCauseTemplate (e.g., root cause node 162) from the graph database 54 to determine the prior probability, such as a Bayesian prior probability.

Next, the host device 25 is configured to detect or find all of the possible observations associated with the root cause. For example, for each possible root cause node 162, the host device 25 is configured to retrieve an ObservationTemplate (e.g., observation node 160) from the graph database 54. In certain cases, an observation node 160 might be applicable to all instances of a type of management object. For example, an observation node 160 indicating that a datastore has experienced a latency anomaly could be applicable to any datastores identified by the host device 25. Accordingly, the graph database 54 may only contain one node 160 for such an observation, but during this process, the host device 25 can create an instance of each observation for each datastore.

As indicated in FIG. 10, observation nodes 160 and root cause nodes 162 have an object type but are not associated with individual management objects. For example, there is an observation node 160-2 for "DS experiencing Latency anomaly", but that observation node 160-2 does not have any relationships to actual datastore nodes. In one arrangement, when loading the observation and root cause nodes 160, 162 from the graph database 54, the host device 25 is configured to load these template nodes 160, 162 replicate the templates for each applicable management object. For example, assume that a datastore is experiencing an anomaly and that there are two VMs related to this datastore. The host device 25 is configured to access a "VM experiencing Latency anomaly" ObservationTemplate 160 from the database 54 and create two instances of an Observation class, one for each of the two VMs the host device 65 is considering. The host device 25 is also configured to access a "VM" RootCauseTemplate 162 from the database 54 and create two instances of the RootCause class, one for each of the two VMs the host device 65 is considering (as well as RootCause instances for other related objects, such as datastores).

As provided above, when the host device 25 executes the root cause function 46, the host device 25 is configured to retrieve the ObservationTemplates 160, RootCauseTemplates 162, and ConditionalProbabilities 166 from the graph database 54. In one arrangement, the host device 25 is configured to create ObservationTemplates 160, RootCauseTemplates 162, and ConditionalProbabilities 166 if they are not present in the graph database 54 or if they are corrupted in some way. For example, if corrupt, the host device 25 is configured to delete any of these objects from the database 54 and then populate the database 54 with default values for these different objects. In this way, the host device 25 is configure to provide the root cause function 46 with the information needed to perform a root cause analysis.

Next, with continued reference to FIG. 10, the host device 25 is configured to determine the conditional probability 166 of each observation node 160 occurring, given each possible root cause node. Each conditional probability 166 can be determined based on the parameters retrieved from the graph database 54, which stores the conditional probabilities as edges linking root cause nodes 162 to observation nodes 160. For example, take the case of a simple environment with one datastore and one VM. The probability of the datastore experiencing a latency spike observation might be 90% if the datastore is the root cause, but the probability of that observation occurring might be only 15% if the VM is the root cause.

The host device 25 is then configured to determine the posterior probability for each root cause node 162. For example, in accordance with the process of Naive Bayes Classifiers, the posterior probability is configured as the product of the prior probability for each root cause node 162 and the conditional probabilities associated with each root cause node and each observation node 160, in the case where the host device 25 has determined that the observation associated with the observation node 160 has occurred.

Based on a comparison of the posterior probabilities for each root cause node 162, the host device 25 is configured to select one or more sources or root causes of the detected anomaly. As provided above, one aspect of anomaly detection involves the determination of the root cause or source of a detected anomaly. In this context, a root cause is a set of one or more management objects (VMs, virtual disks, datastores, etc.) that are considered to have caused the problem. In the case where multiple related management objects each experience an anomaly, these anomalies are considered part of the same event, and therefore share the same root cause. Accordingly, based upon the root cause analysis described above, the host device 25 is configured to select one or more objects associated with the computer infrastructure 11 as the source of the detected anomaly.

The following describes an example process for determining anomaly root causes, such as by using a Naive Bayes Classifier. In the process, the management object having an anomaly is identified by the host device 25. Then, that object and all of its related objects are considered possible root causes. The host device 25 determines whether the behaviors observed in the infrastructure 11 are likely or unlikely, given each possible root cause. Using the conventional Naive Bayes Classifier process, the host device 25 is configured to determine the posterior probability of each possible root cause as being the true root cause of the detected anomaly. Finally, the host device 25 is configured to select one or more root causes as the most likely root cause of the anomaly.

Further with respect to the example process described below, when the host device 25 detects an anomaly, the host device 25 is configured to selects one or more management objects as the root cause of the anomaly. The host device 25 selects a root cause even if the current anomaly is the only anomaly in progress. For example, if one VM experiences an anomaly when no related objects are experiencing an anomaly, the host device 25 is configured to select an appropriate root cause. Further, if a second related VM experiences an anomaly, the host device 25 is configured to consider both anomalies as part of the same event. As a result, the host device 25 can select a root cause for this event, which now contains two anomalies.

For example, with reference to FIG. 9, consider an environment or topology 150 having a first virtual machine 122-1, termed VM_Red or VM_R herein, a second virtual machine 122-2, termed VM_Blue or VM_B herein, and a datastore 129, termed DS_Silver or DS_Si herein. Further, consider a sequence in which the following scenarios are observed:

(1) VM_Red experiences a latency anomaly (while the other objects are in a normal state)

(2) While VM_Red is still experiencing the anomaly, DS_Silver experiences a latency anomaly (while VM_Blue is still in the normal state)

(3) While VM_Red and DS_Silver are still experiencing the anomaly, VM_Blue starts to experience a Latency anomaly. At this point all objects are experiencing a latency anomaly When the host device 25 executes the root cause function 46, the host device 25 is configured to consider each of these scenarios. For example, because the environment 150 contains three management objects, there are three possible root causes for any anomaly observed:

(1) VM_Red (i.e., possible root cause RC_Red). For any anomaly, the prior probability is 25%—this is notated as P(RC_Red)=0.25.

(2) DS_Silver (i.e., possible root cause RC_Silver). For any anomaly, the prior probability is 50%—this is notated as P(RC_Silver)=0.5.

(3) VM_Blue (i.e., possible root cause RC_Blue). For any anomaly, the prior probability is 25%—this is notated as P(RC_Blue)=0.25.

The host device 25 is configured to track the following observations using the Naive Bayes Classifier. The mathematical notation used for conditional probabilities is as follows. P(A|B)=0.75 can be read as "The probability of event A occurring given that event B has occurred is 75%". The following table identifies each observation and associated conditional probability associated with each observation based upon the Naive Bayes Classifier.

| Observation Description | Feature name when Observation has occurred | Feature name when Observation has not occurred | Conditional Probability for RC_Red |
|---|---|---|---|
| VM_Red has experienced a Latency anomaly | Lat_Red | NOT_Lat_Red | P(Lat_Red\|RC_Red) = 1.0<br>P(NOT_Lat_Red\|RC_Red) = 0.0 |
| DS_Silver has experienced a Latency anomaly | Lat_Silver | NOT_Lat_Silver | P(Lat_Silver\|RC_Red) = 0.10<br>P(NOT_Lat_Silver\|RC_Red) = 0.9 |
| VM_Blue has experienced a Latency anomaly | Lat_Blue | NOT_Lat_Blue | P(Lat_Blue\|RC_Red) = 0.35<br>P(NOT_Lat_Blue\|RC_Red) = 0.65 |
| Multiple IOPs anomalies are currently ongoing | Multi_Anom | NOT_Multi_Anom | P(Multi_Anom\|RC_Red) = 0.15<br>P(NOT_Multi_Anom\|RC_Red) = 0.85 |

| Observation Description | Conditional Probability for RC_Silver | Conditional Probability for RC_Blue |
|---|---|---|
| VM_Red has experienced a Latency anomaly | P(Lat_Red\|RC_Silver) = 0.25<br>P(NOT_Lat_Red\|RC_Silver) = 0.75 | P(Lat_Red\|RC_Blue) = 0.35<br>P(NOT_Lat_Red\|RC_Blue) = 0.65 |
| DS_Silver has experienced a Latency anomaly | P(Lat_Silver\|RC_Silver) = 1.0<br>P(NOT_Lat_Silver\|RC_Silver) = 0.0 | P(Lat_Silver\|RC_Blue) = 0.10<br>P(NOT_Lat_Silver\|RC_Blue) = 0.90 |
| VM_Blue has experienced a Latency anomaly | P(Lat_Blue\|RC_Silver) = 0.25<br>P(NOT_Lat_Blue\|RC_Silver) = 0.75 | P(Lat_Blue\|RC_Blue)= 1.0<br>P(NOT_Lat_Blue\|RC_Blue) = 0.0 |
| Multiple IOPs anomalies are currently ongoing | P(Multi_Anom\|RC_Silver) = 0.80<br>P(NOT_Multi_Anom\|RC_Silver) = 0.20 | P(Multi_Anom\|RC_Blue) = 0.15<br>P(NOT_Multi_Anom\|RC_Blue) = 0.85 |

The host device 25 is configured to use the prior probabilities and conditional probabilities determine the posterior probabilities at each of the scenarios of the sequence noted above.

Scenario 1: VM_Red in Anomaly

In the first scenario of the sequence, VM_Red is in a latency anomaly but the other objects are not in an anomaly state. The observations of the system are in the current state:
Lat_Red,NOT_Lat_Silver,NOT_Lat_Blue,NOT_Multi_Anom The host device 25 calculates the posterior probabilities as follows:
P(RC_Red|Lat_Red,NOT_Lat_Silver,NOT_Lat_Blue, NOT_Multi_Anom)=P(RC_Red)*P(Lat_Red|RC_Red)*P(NOT_Lat_Silver|RC_Red)*P(NOT_Lat_Blue|RC_Red)*P(NOT_Multi_Anom|RC_Red)=0.25*1.0*0.9*0.65*0.85=0.1243=12.43%
P(RC_Silver|Lat_Red,NOT_Lat_Silver,NOT_Lat_Blue, NOT_Multi_Anom)=P(RC_Silver)*P(Lat_Red|RC_Silver)*P(NOT_Lat_Silver|RC_Silver)*P(NOT_Lat_Blue|RC_Silver)*P(NOT_Multi_Anom|RC_Silver)=0.50*0.25*0.0*0.75*0.2=0.00=0.0%
P(RC_Blue|Lat_Red,NOT_Lat_Silver,NOT_Lat_Blue, NOT_Multi_Anom)=P(RC_Blue)*P(Lat_Red|RC_Blue)*P(NOT_Lat_Silver|RC_Blue)*P(NOT_Lat_Blue|RC_Blue)*P(NOT_Multi_Anom|RC_Blue)=0.25*0.35*0.9*0.0*0.85=0.00=0.0%

Because the calculated posterior for RC_Red is much larger than RC_Silver or RC_Blue, the host device 25 determines that VM_Red is the root cause of the anomaly at this point.

Scenario 2: VM_Red in Anomaly, DS_Silver in Anomaly

In the second scenario of the sequence, VM_Red is in a latency anomaly and DS_Silver is in a latency anomaly, while VM_Blue is not. Since there are now two objects experiencing an anomaly, the host device 25 also switches from NOT_Multi_Anom to Multi_Anom. The observations of the system are in the current state:
Lat_Red,Lat_Silver,NOT_Lat_Blue,Multi_Anom The host device 25 then determines the posterior probabilities as follows:
P(RC_Red|Lat_Red,Lat_Silver,NOT_Lat_Blue,Multi_Anom)=P(RC_Red)*P(Lat_Red|RC_Red)*P(Lat_Silver|RC_Red)*P(NOT_Lat_Blue|RC_Red)*P(Multi_Anom|RC_Red)=0.25*1.0*0.1*0.65*0.15=0.0024=0.24%
P(RC_Silver|Lat_Red,Lat_Silver,NOT_Lat_Blue,Multi_Anom)=P(RC_Silver)*P(Lat_Red|RC_Silver)*P(Lat_Silver|RC_Silver)*P(NOT_Lat_Blue|RC_Silver)*P(Multi_Anom|RC_Silver)=0.50*0.25*1.0*0.75*0.8=0.075=7.5%
P(RC_Blue|Lat_Red,Lat_Silver,NOT_Lat_Blue,Multi_Anom)=P(RC_Blue)*P(Lat_Red|RC_Blue)*P(Lat_Silver|RC_Blue)*P(NOT_Lat_Blue|RC_Blue)*P(Multi_Anom|RC_Blue)=0.25 0.35*0.1*0.0*0.15=0.00=0.0%

Because the calculated posterior for DS_Silver is much larger than RC_Red or RC_Blue, the host device 25 detects that DS_Silver is the root cause of the anomaly at this point. The event that was created in Scenario 1 is updated to reflect that DS_Silver is the root cause.

Scenario 3: VM_Red in Anomaly, DS_Silver in Anomaly

In the third scenario of the sequence, VM_Red, DS_Silver, and VM_Blue are all experiencing a latency anomaly. The observations of the system are in the current state:
Lat_Red,Lat_Silver,Lat_Blue,Multi_Anom The host device 25 calculates the posterior probabilities as follows:
P(RC_Red|Lat_Red,Lat_Silver,Lat_Blue,Multi_Anom)=P(RC_Red)*P(Lat_Red|RC_Red)*P(Lat_Silver|RC_Red)*P(Lat_Blue|RC_Red)*P(Multi_Anom|RC_Red)=0.25*1.0*0.1*0.35*0.15=0.0013=0.13%
P(RC_Silver|Lat_Red,Lat_Silver,Lat_Blue,Multi_Anom)=P(RC_Silver)*P(Lat_Red|RC_Silver)*P(Lat_Silver|RC_Silver)*P(Lat_Blue|RC_Silver)*P(Multi_Anom|RC_Silver)=0.50*0.25*1.0*0.25*0.8=0.025=2.5%
P(RC_Blue|Lat_Red,Lat_Silver,Lat_Blue,Multi_Anom)=P(RC_Blue)*P(Lat_Red|RC_Blue)*P(Lat_Silver|RC_Blue)*P(Lat_Blue|RC_Blue)*P(Multi_Anom|RC_Blue)=0.25*0.35*0.1*1.0*0.15=0.0013=0.13%

Because the calculated posterior for DS_Silver is much larger than RC_Red or RC_Blue, the host device 25 can determine that DS_Silver is the root cause of the anomaly at this point. The event that was created in Scenario 1 is updated to reflect that DS_Silver is the root cause.

Based on the prior probabilities and conditional probabilities, the host device 25 assigned a root cause to the anomalies at each scenario in the sequence. When only VM_Red was experiencing an anomaly, VM_Red was identified as the root cause. When both VM_Red and DS_Silver were experiencing an anomaly, DS_Silver was identified as the root cause. When VM_Red, DS_Silver, and VM_Blue were experiencing an anomaly, DS_Silver was again identified as the root cause.

Note that if the prior or conditional probabilities had been different, different conclusions could have been reached at each scenario of the sequence.

In one arrangement, learning is utilized as part of the root cause function 46. This learning can be done through the means of semi-supervised method incorporating user input into the decision making (analysis) process which may (not limited to) include changes to the UI to incorporate the input on the accuracy of the root cause analysis. Based on this user input, the probabilities in the model will be changed to more accurately select root causes for anomalies.

Gaussian Naive Bayes Classifier

In one arrangement, the Naive Bayes Classifier is configured to calculate probabilities not just for boolean observations, but also for measurements that lie along a Gaussian distribution. For example, there can be an Observation that represents the greatest latency measurement for a VM during a certain time frame. The Naive Bayes Classifier can then use this measurement to calculate a conditional probability, instead of just using a yes/no response to calculate the probability.

As provided above, the host device 25 is configured to access of a graph database 54 and identify particular elements of a computer infrastructure 11 that are affected by detected anomalies. The host device 25 is configured to analyze whether those elements are truly experiencing an issue by analyzing the VM specific I/O performance data using root cause analysis, via a root cause function 46. With such a configuration, the host device 25 can provide to an end user (e.g., systems administrator) identification 52 regarding the probable causes of the detected anomalies in a substantially timely manner. For example, returning to the flowchart 100 of FIG. 3, in element 108, the host device 25 is configured to output an identification 52 of a root object associated with the anomaly based upon the identified root cause probability.

Figure 11:
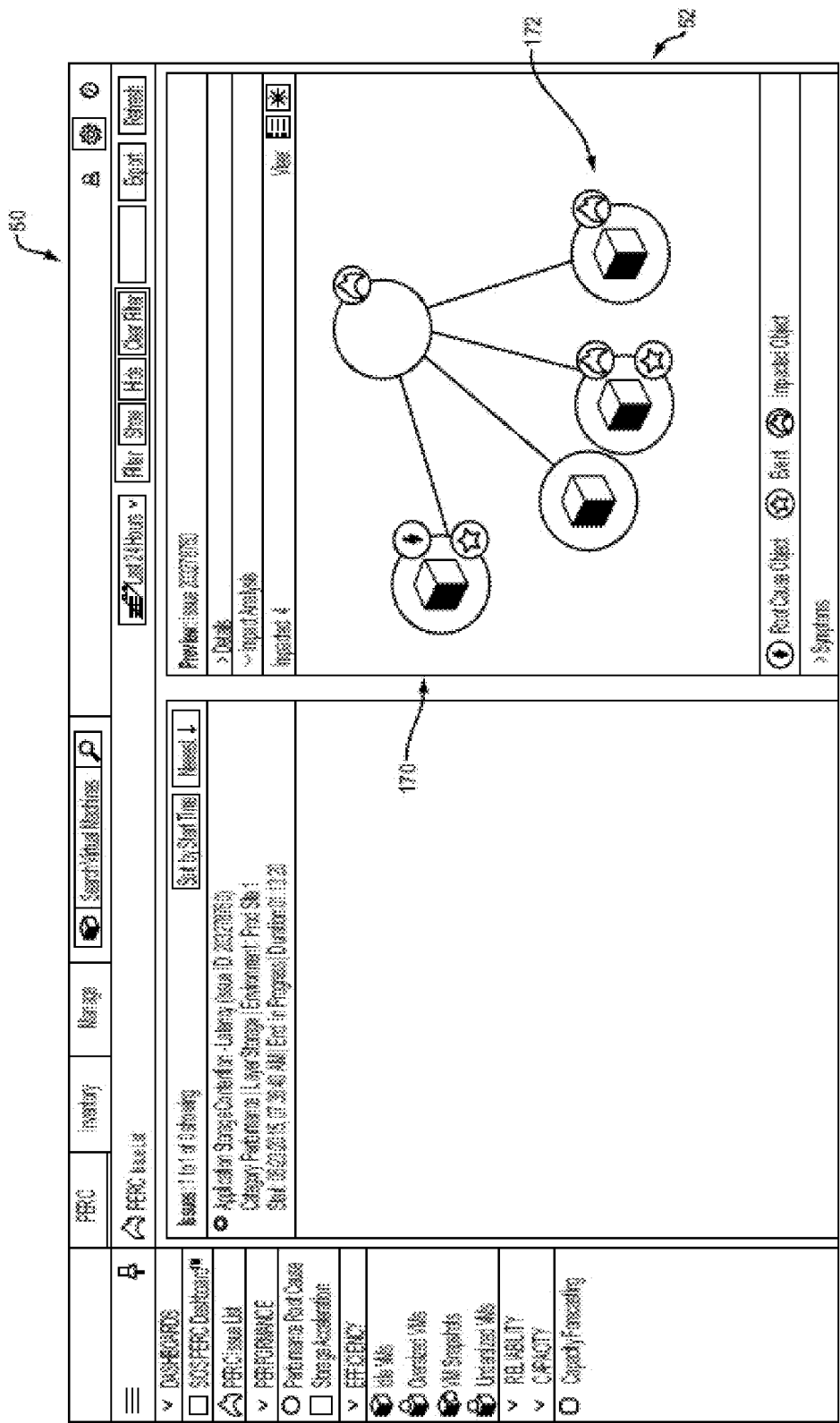
FIG. 11 illustrates an example of a graphical user interface as output by the host device of FIG. 4, according to one arrangement.

The host device 25 can provide the identification 52 in a variety of ways. For example, the host device 25 can transmit the identification 52 to the display 55 as a user interface (UI) output 50. For example, as shown in FIG. 11, the host device 25 provides the identification 52 as part of a GUI 50 which indicates the object 170 which is the source of the anomaly, as well as related objects 172 which are affected by the anomaly. Such identification allows a systems administrator to determine the source of the anomaly and to take corrective action, if necessary. In one arrangement, following the root cause analysis of the workloads running on the VMs, the UI suggests to the end user (e.g., systems administrator) an identification of probable causes of detected anomalies in the computer environment.

Figure 12:
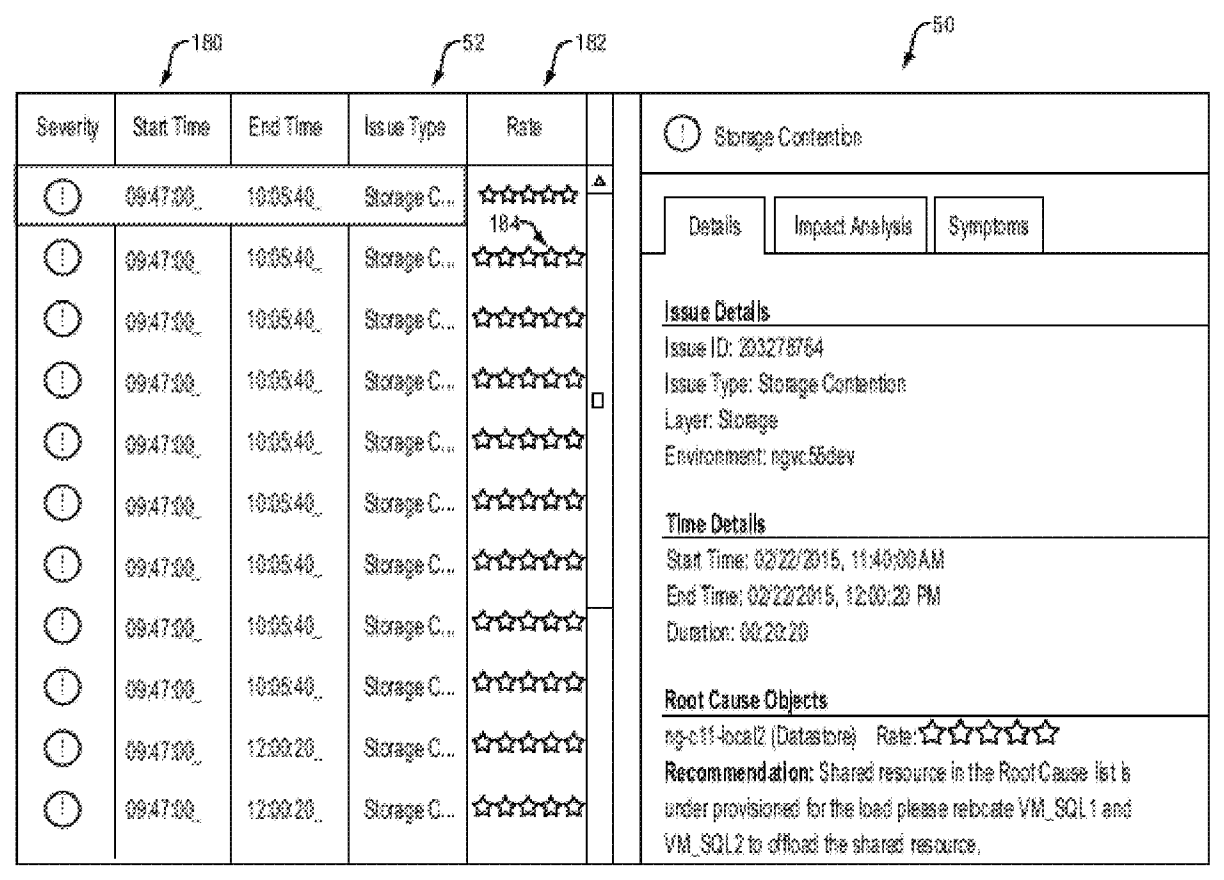

In one arrangement, the host device 25 is configured to provide the identification 52 as a UI which allows the end user to rate or rank the detected root cause. For example, with reference to FIG. 12, the host device 25 provides the identification 52 as a user interface (UI) output 50 which includes a listing of detected anomaly sources (i.e., root causes) 180 and a ranking input section 182. The ranking input section 182 allows the end user to rank 184 the importance of the detected anomaly. In the case where the rank 184 reaches a particular threshold, the host device 25 is configured to perform a second root cause analysis on the ranked anomaly to recalculate the root cause analysis probabilities. With such a configuration, the host device 25 incorporates semi-supervised learning through the user input to dynamically update root cause analysis.

While various embodiments of the innovation have been particularly shown and described, it will be understood by those skilled in the art that various changes in form and details may be made therein without departing from the spirit and scope of the innovation as defined by the appended claims.

What is claimed is:

1. In a host device, a method for performing an anomaly analysis of a computer environment, comprising:
   determining, by the host device, an anomaly associated with an attribute of a computer environment resource of the computer infrastructure, comprising:
      applying, by host device, a classification function to a set of data elements related to the attribute of the computer infrastructure resources of the computer infrastructure to define at least one group of data elements of the set of data elements, and
      identifying, by host device, a data element of the set of data elements as an anomalous element associated with the attribute when the data element falls outside of the at least one group of data elements;
   correlating, by the host device, an object associated with the attribute of the detected anomaly with a related object of the computer infrastructure;
   determining, by the host device, a root cause probability for each object of the correlated objects, the root cause probability identifying a probability of the correlated object functioning as a cause of the detected anomaly; and
   outputting, by the host device, an identification of a root object associated with the anomaly based upon the identified root cause probability.

2. The method of claim 1, wherein applying the classification function to the set of data elements to define the at least one group of data elements of the set of data elements comprises applying, by host device, a clustering function to the set of data elements to define at least one cluster of data elements of the set of data elements.

3. The method of claim 2, wherein identifying the data element of the set of data elements as the anomalous element associated with the attribute when the data element falls outside of the at least one group of data elements comprises identifying, by host device, the data element of the set of data elements as the anomalous element associated with the attribute when the data element falls outside of the at least one cluster of data elements of the set of data elements.

4. The method of claim 2, further comprising:
   applying, by host device, a learned behavior function to the at least one cluster of data elements of the set of data elements, the learned behavior function defining at least one learned behavior boundary relative to the at least one cluster of data elements; and
   wherein identifying the data element of the set of data elements as the anomalous element associated with the attribute when the data element falls outside of the at least one group of data elements comprises identifying, by host device, the data element of the set of data elements as the anomalous element associated with the attribute when the data element falls outside of the at least one learned behavior boundary.

5. The method of claim 4, further comprising:
   applying, by host device, a sensitivity function to the at least one learned behavior boundary, the sensitivity function defining a sensitivity boundary relative to at least one learned behavior boundary; and
   wherein identifying the data element of the set of data elements as the anomalous element associated with the attribute when the data element falls outside of the at least one group of data elements comprises identifying, by the host device, the data element of the set of data elements as the anomalous element associated with the attribute when the data element falls outside of the sensitivity boundary.

6. The method of claim 1, wherein correlating the object associated with the attribute of the detected anomaly with the related object of the computer infrastructure comprises:
   accessing, by the host device, a graph database; and
   identifying, by the host device, the object associated with the attribute of the detected anomaly and the related object via the graph database.

7. The method of claim 1, wherein determining the root cause probability for each object of the correlated objects comprises:
   detecting, by the host device, a prior probability of an anomaly caused by one of anomalous object and related objects;
   detecting, by the host device, a conditional probability of anomaly caused by one of anomalous object and related objects; and
   detecting, by the host device, a posterior probability of anomaly caused by one of anomalous object and related objects, the posterior probability based on the prior probability and the conditional probability.

8. The method of claim 1, wherein outputting the identification of the root object associated with the anomaly based upon the determined root cause probability comprises:
   providing, by the host device, a user interface identifying at least one probable cause of a detected anomaly in the computer environment;
   receiving, by the host device, ranking information associated with the detected anomaly; and
   performing, by the host device, a second root cause analysis on the data set based upon the ranking information.

9. The method of claim 1, further comprising:
updating, by the host device, the set of data elements related to the attribute of the computer infrastructure resources to include updated data elements; and
applying, by host device, the classification function to the set of data elements, including the updated data elements, to define at least one group of data elements of the set of data elements.

10. A host device, comprising:
a controller having a memory and a processor, the controller configured to:
determine an anomaly associated with an attribute of a computer environment resource of the computer infrastructure wherein, when determining the anomaly associated with the attribute of the computer infrastructure resource, the controller is configured to:
apply a characterization function to a set of data elements related to the attribute of the computer infrastructure resources of the computer infrastructure to define at least one group of data elements of the set of data elements, and
identify a data element of the set of data elements as an anomalous element associated with the attribute when the data element falls outside of the at least one group of data elements;
correlate an object associated with the attribute of the detected anomaly with a related object of the computer infrastructure;
determine a root cause probability for each object of the correlated objects, the root cause probability identifying a probability of the correlated object functioning as a cause of the detected anomaly; and
output an identification of a root object associated with the anomaly based upon the identified root cause probability.

11. The host device of claim 10, wherein when applying the characterization function to the set of data elements to define the at least one group of data elements of the set of data elements, the host device is configured to apply a clustering function to the set of data elements to define at least one cluster of data elements of the set of data elements.

12. The host device of claim 11, wherein when identifying the data element of the set of data elements as the anomalous element associated with the attribute when the data element falls outside of the at least one group of data elements, the controller is configured to identify the data element of the set of data elements as the anomalous element associated with the attribute when the data element falls outside of the at least one cluster of data elements of the set of data elements.

13. The host device of claim 11, wherein the controller is further configured to:
apply a learned behavior function to the at least one cluster of data elements of the set of data elements, the learned behavior function defining at least one learned behavior boundary relative to the at least one cluster of data elements; and
when identifying the data element of the set of data elements as the anomalous element associated with the attribute when the data element falls outside of the at least one group of data elements, the controller is configured to identify the data element of the set of data elements as the anomalous element associated with the attribute when the data element falls outside of the at least one learned behavior boundary.

14. The host device of claim 13, wherein the controller is further configured to:
apply a sensitivity function to the at least one learned behavior boundary, the sensitivity function defining a sensitivity boundary relative to at least one learned behavior boundary; and
when identifying the data element of the set of data elements as the anomalous element associated with the attribute when the data element falls outside of the at least one group of data elements, the controller is configured to identify the data element of the set of data elements as the anomalous element associated with the attribute when the data element falls outside of the sensitivity boundary.

15. The host device of claim 10, wherein when correlating the object associated with the attribute of the detected anomaly with the related object of the computer infrastructure, the controller is configured to:
access a graph database; and
identify the object associated with the attribute of the detected anomaly and the related object via the graph database.

16. The host device of claim 10, wherein when wherein determining the root cause probability for each object of the correlated objects, the host device is configured to:
detect a prior probability of an anomaly caused by one of anomalous object and related objects;
detect a conditional probability of anomaly caused by one of anomalous object and related objects; and
detect a posterior probability of anomaly caused by one of anomalous object and related objects, the posterior probability based on the prior probability and the conditional probability.

17. The host device of claim 10, wherein when outputting the identification of the root object associated with the anomaly based upon the determined root cause probability, the controller is configured to:
provide a user interface identifying at least one probable cause of a detected anomaly in the computer environment;
receive ranking information associated with the detected anomaly; and
perform a second root cause analysis on the data set based upon the ranking information.

18. The host device of claim 10, wherein the controller is further configured to:
update the set of data elements related to the attribute of the computer infrastructure resources to include updated data elements; and
apply the classification function to the set of data elements, including the updated data elements, to define at least one group of updated data elements of the set of data elements.

19. In a host device, a method for performing an anomaly analysis of a computer environment, comprising:
determining, by the host device, an anomaly associated with an attribute of a computer environment resource of the computer infrastructure;
correlating, by the host device, an object associated with the attribute of the detected anomaly with a related object of the computer infrastructure, comprising:
accessing, by the host device, a graph database, and
identifying, by the host device, the object associated with the attribute of the detected anomaly and the related object via the graph database;
determining, by the host device, a root cause probability for each object of the correlated objects, the root cause probability identifying a probability of the correlated object functioning as a cause of the detected anomaly; and outputting, by the host device, an identification of a root object associated with the anomaly based upon the identified root cause probability.

20. A host device, comprising:

a controller having a memory and a processor, the controller configured to:

determine an anomaly associated with an attribute of a computer environment resource of the computer infrastructure;

correlate an object associated with the attribute of the detected anomaly with a related object of the computer infrastructure, wherein when correlating the object associated with the attribute of the detected anomaly with the related object of the computer infrastructure, the controller is configured to:

access a graph database, and identify the object associated with the attribute of the detected anomaly and the related object via the graph database;

determine a root cause probability for each object of the correlated objects, the root cause probability identifying a probability of the correlated object functioning as a cause of the detected anomaly; and output an identification of a root object associated with the anomaly based upon the identified root cause probability.

21. In a host device, a method for performing an anomaly analysis of a computer environment, comprising:

determining, by the host device, an anomaly associated with an attribute of a computer environment resource of the computer infrastructure;

correlating, by the host device, an object associated with the attribute of the detected anomaly with a related object of the computer infrastructure;

determining, by the host device, a root cause probability for each object of the correlated objects, the root cause probability identifying a probability of the correlated object functioning as a cause of the detected anomaly, comprising:

detecting, by the host device, a prior probability of an anomaly caused by one of anomalous object and related objects, detecting, by the host device, a conditional probability of anomaly caused by one of anomalous object and related objects, and detecting, by the host device, a posterior probability of anomaly caused by one of anomalous object and related objects, the posterior probability based on the prior probability and the conditional probability; and outputting, by the host device, an identification of a root object associated with the anomaly based upon the identified root cause probability.

22. A host device, comprising:

a controller having a memory and a processor, the controller configured to:

determine an anomaly associated with an attribute of a computer environment resource of the computer infrastructure;

correlate an object associated with the attribute of the detected anomaly with a related object of the computer infrastructure;

determine a root cause probability for each object of the correlated objects, the root cause probability identifying a probability of the correlated object functioning as a cause of the detected anomaly wherein, when determining the root cause probability for each object of the correlated objects, the host device is configured to:

detect a prior probability of an anomaly caused by one of anomalous object and related objects, detect a conditional probability of anomaly caused by one of anomalous object and related objects, and detect a posterior probability of anomaly caused by one of anomalous object and related objects, the posterior probability based on the prior probability and the conditional probability; and output an identification of a root object associated with the anomaly based upon the identified root cause probability.

* * * * *